(12) United States Patent
Suzuki

(10) Patent No.: US 6,205,773 B1
(45) Date of Patent: Mar. 27, 2001

(54) EXHAUST GAS PURIFICATION DEVICE FOR AN INTERNAL COMBUSTION ENGINE

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/344,123

(22) Filed: Jun. 24, 1999

(30) Foreign Application Priority Data

Jul. 7, 1998 (JP) .................................................. 10-191541
Aug. 19, 1998 (JP) .................................................. 10-233242

(51) Int. Cl.⁷ ...................................................... F01N 3/00
(52) U.S. Cl. ............................. 60/276; 60/285; 60/286; 60/295; 60/297; 123/443
(58) Field of Search ............................. 60/276, 285, 286, 60/295, 297, 301; 123/443, 300

(56) References Cited

U.S. PATENT DOCUMENTS

| | | | |
|---|---|---|---|
| 5,642,705 | * 7/1997 | Morikawa et al. | 123/300 |
| 5,713,199 | * 2/1998 | Takeshima et al. | 60/276 |
| 5,758,493 | * 6/1998 | Asik et al. | 60/274 |
| 5,771,685 | * 6/1998 | Hepburn | 60/274 |
| 5,778,666 | * 7/1998 | Cullen et al. | 60/274 |
| 5,970,707 | * 10/1999 | Sawada et al. | 60/277 |
| 5,974,793 | * 11/1999 | Kinugasa et al. | 60/285 |
| 6,014,859 | * 1/2000 | Yoshizaki et al. | 60/285 |

FOREIGN PATENT DOCUMENTS

| 6-88518 | 3/1994 | (JP) . |
|---|---|---|
| 8-61052 | 3/1996 | (JP) . |

\* cited by examiner

*Primary Examiner*—Thomas Denion
*Assistant Examiner*—Binh Tran
(74) *Attorney, Agent, or Firm*—Oliff & Berridge PLC.

(57) ABSTRACT

An NOx occluding and reducing catalyst is disposed in an exhaust gas passage of an internal combustion engine to absorb NOx in the exhaust gas when the air-fuel ratio of the exhaust gas is lean, and to release and reduce the absorbed NOx when the air-fuel ratio of the exhaust gas is rich. A recovery operation is executed only under particular operating conditions of the engine to heat the NOx occluding and reducing catalyst so as to release NOx as well as SOx absorbed thereby. The engine operating conditions for executing the recovery operation are expanded with an increase in the amount of SOx held by the NOx occluding and reducing catalyst while preventing a drop in the engine fuel efficiency. The recovery operation is easily executed with an increase in the holding amount of SOx, and a state in which SOx are held in increased amounts by the NOx occluding and reducing catalyst is prevented from lasting long.

13 Claims, 21 Drawing Sheets

(CATALYST IS FREQUENTLY HEATED AT HIGH TEMP.)

(CATALYST IS FREQUENTLY HEATED AT LOW TEMP.)

EXHAUST GAS PURIFICATION DEVICE FOR AN INTERNAL COMBUSTION ENGINE

BACKGROUND OF THE INVENTION

1. Field of the Invention

The present invention relates to an exhaust gas purification device for an internal combustion engine. More specifically, the invention relates to an exhaust gas purification device equipped with an NOx occluding and reducing catalyst for removing NOx components from the exhaust gas of an engine.

2. Description of the Related Art

There has been known an exhaust gas purification device using an NOx occluding and reducing catalyst comprising at least one element selected from alkali metals such as pottasium K, sodium Na, lithium Li and cesium Cs, alkaline earth elements such as barium Ba and calcium Ca, and rare earth elements such as lanthanum La and yttrium Y, as well as a noble metal such as platinum Pt.

The NOx occluding and reducing catalyst works to absorb and release NOx, i.e., absorbs NOx in the exhaust gas in the form of nitrates when the air-fuel ratio of the exhaust gas that flow in is lean, releases the absorbed NOx when the oxygen concentration decreases in the exhaust gas that flow in, and purifies the released NOx by reduction with reducing components in the exhaust gas.

The action for absorbing and releasing NOx by the NOx occluding and reducing catalyst will be described later. However, when sulfur oxides (SOx) exist in the exhaust gas, the NOx occluding and reducing catalyst absorbs SOx in the exhaust gas based on the same mechanism as that of NOx absorption.

However, SOx absorbed by the NOx occluding and reducing catalyst forms stable sulfates which are generally very little decomposed or released and, hence, tend to build up in the NOx occluding and reducing catalyst. When SOx is held in an increased amount by the NOx occluding and reducing catalyst, the NOx occluding and reducing catalyst exhibits a decreased NOx-absorbing capacity by an amount by which SOx is held. When SOx is held in increased amounts by the NOx occluding and reducing catalyst, therefore, it becomes no longer possible to remove NOx from the exhaust gas to a sufficient degree, i.e., a so-called SOx contamination of the Nox occluding and reducing catalyst occurs.

It is also known that SOx absorbed by the NOx occluding and reducing catalyst can be released and reduced relying on the same mechanism for releasing and reducing NOx. However, since sulfates held in the NOx occluding and reducing catalyst are relatively stable, SOx absorbed by the NOx occluding and reducing catalyst cannot be released at a temperature (e.g., about 250° C.) at which the operation is usually conducted to release and purify NOx by reduction (hereinafter referred to as "a regenerating operation" for the NOx occluding and reducing catalyst). In order to remove the SOx contamination, therefore, the SOx contamination-recovery operation must be regularly conducted by heating the NOx occluding and reducing catalyst at a temperature (e.g., 600° C. or higher) which is higher than that when the NOx occluding and reducing catalyst is usually being generated, and by shifting the air-fuel ratio of the exhaust gas that is flowing in toward the rich side.

An exhaust gas purification device which executes the SOx contamination-removing operation for the NOx occluding and reducing catalyst, has been taught in, for example, Japanese Unexamined Patent Publication (Kokai) No. 6-88518. In order to recover the SOx-contaminated NOx occluding and reducing catalyst according to the device of the above publication, the exhaust gas is put into a stoichiometric state or a rich state to lower the oxygen concentration when the temperature of the exhaust gas becomes high.

Japanese Unexamined Patent Publication (Kokai) No. 8-61052 discloses another exhaust gas purification device for recovering the NOx occluding and reducing catalyst from the SOx contamination by regenerating the NOx occluding and reducing catalyst at a high temperature. In order to recover the NOX occluding and reducing catalyst arranged in the exhaust passage of an internal combustion engine from the SOx contamination according to the exhaust gas purification device of this publication, some of the cylinders of the engine are operated at a rich air-fuel ratio and the rest of the cylinders are operated at a lean air-fuel ratio to remove the SOx contamination when the amount of SOx held by the NOx occluding and reducing catalyst becomes greater than a predetermined value and the engine is operated in a particular load region (intermediate to high load region). By operating some cylinders of the engine at a rich air-fuel ratio and the rest of the cylinders at a lean air-fuel ratio, exhaust gas from the rich air-fuel ratio cylinders containing unburned fuel and exhaust gas from the lean air-fuel ratio cylinders containing large amounts of oxygen flow into the catalyst. Therefore, the unburned fuel burns on the catalyst, whereby the temperature of the catalyst rises and SOx held by the NOx occluding and reducing catalyst is released.

According to the devices of the above-mentioned Japanese Unexamined Patent Publications (Kokai) Nos. 6-88518 and 8-610652, however, it is not allowed to frequently conduct the SOx contamination-recovery operation, and a state in which the purification efficiency of the NOx occluding and reducing catalyst is lowered due to the SOx contamination often continues for extended periods of time. According to the devices of the above-mentioned publications, the recovery operation from the SOx contamination is not executed unless the exhaust gas temperature of the engine becomes high or unless the engine is operated under a particular condition even if the amount of SOx held by the NOx occluding and reducing catalyst exceeds a predetermined value.

By using the devices of the above-mentioned publications, therefore, the operation often continues for extended periods of time in a state where SOx are held in increased amounts by the NOx occluding and reducing catalyst depending upon the operating conditions of the engine, and NOx which has not been purified are released to the open air due to a drop in the purification efficiency of the NOx occluding and reducing catalyst.

In conducting the above-mentioned recovery operation from the SOx contamination of the NOx occluding and reducing catalyst, SOx is still formed by sulfur contained in the fuel when the engine is in operation, and a difference occurs in the degree of removing the SOx contamination from the NOx occluding and reducing catalyst depending upon the SOx concentration in the exhaust gas during this period. When the exhaust gas is put into a predetermined stoichiometric state or a rich state, depending on the prior art, without taking the above-mentioned fact into consideration, then, the SOx contamination is not removed to a sufficient degree, or the exhaust gas becomes excessively rich to deteriorate the fuel efficiency and the exhaust gas emission.

SUMMARY OF THE INVENTION

In view of the problems in the related art as set forth above, the object of the present invention is to provide a means which prevents a state in which SOx are held in large amounts by the NOx occluding and reducing catalyst from lasting for extended periods of time while limiting the condition for heating the NOx occluding and reducing catalyst at the time of conducting the recovery operation for removing the SOx contamination from the NOx occluding and reducing catalyst, and preventing the fuel efficiency and the condition of exhaust gas from deteriorating.

Another object of the present invention is to provide an exhaust gas purification device for an internal combustion engine which is capable of completely removing the contamination without deteriorating the exhaust gas emission at the time of conducting the recovery operation for removing the contamination from the NOx occluding and reducing catalyst.

The objects as set forth above are achieved by an exhaust gas purification device for an internal combustion engine according to the present invention, comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the amount of said contaminants that are held.

According to this aspect of the invention, the heating-conducting condition-setting means sets the heating-conducting condition for heating the NOx occluding and reducing catalyst depending upon the amounts of contaminants held by the NOx occluding and reducing catalyst, in such a manner that the heating-conducting condition becomes wide (i.e., less stringent), for example, as the amount of contaminants held by the NOx occluding and reducing catalyst increases. Therefore, the NOx occluding and reducing catalyst is frequently heated with an increase in the amount of the contaminant held by the NOx occluding and reducing catalyst, and the state in which the contaminant is held in an increased amount is prevented from lasting long.

According to another aspect of the present invention, there is provided an exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants held by being adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the history of the operating conditions of the engine.

According to this aspect of the invention, the condition for heating the NOx occluding and reducing catalyst is set depending upon the history of the operating condition of the engine. When, for example, the heating-conducting condition has been so set that heating the catalyst is conducted when the catalyst temperature is not lower than a predetermined lower-limit temperature, then, the catalyst temperature frequently exceeds the lower-limit temperature and the heating is frequently conducted in the case of an engine which is likely to be frequently operated in such a manner that the catalyst temperature becomes high. It is not therefore likely that the state in which the contaminants are held in increased amounts by the NOx occluding and reducing catalyst lasts long. In the case of the engine which is not so likely to be so operated that the catalyst temperature becomes high, it becomes probable that the state in which the contaminants are held in increased amounts, by the NOx occluding and reducing catalyst, lasts long. According to this aspect of the invention, therefore, when it is judged that the engine is not so likely to be so operated that the catalyst temperature becomes high from the past history of the operating condition of the engine, the heating-conducting condition is so set that the heating-conducting condition is widened (i.e., becomes less stringent) as the amount of the contaminants held by the NOx occluding and reducing catalyst increases (e.g., so that the lower-limit catalyst temperature for conducting the heating decreases as the amount of contaminants held in the catalyst increases). Therefore, the state in which the contaminants are held in large amounts by the NOx occluding and reducing catalyst, is prevented from lasting long irrespective of the operating condition of the engine.

According to a further aspect of the present invention, there is provided an exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and purify the absorbed NOx by reduction when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants held by being adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the properties of the fuel of the engine.

According to this aspect of the invention, the heating-conducting condition is set depending upon the properties of the fuel. The rate of an increase in the amount of contaminants held by the NOx occluding and reducing catalyst changes depending upon the properties of the fuel. When sulfur components are contained in large amounts in the fuel, for example, the amount of SOx absorbed and held by the NOx occluding and reducing catalyst increases at a large rate, and the heating (contamination-recovery operation) must be frequently conducted. According to this aspect of the invention, therefore, when a fuel having properties that permit contaminants to easily accumulate on the NOx occluding and reducing catalyst is used, the heating-conducting condition is widely set so that the heating of the NOx occluding and reducing catalyst is frequently conducted while the engine is in operation. Therefore, the state in which the contaminants are held in large amounts by the NOx occluding and reducing catalyst does not last long irrespective of the properties of the fuel.

According to a further aspect of the present invention, there is provided an exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and purify the absorbed NOx by reduction when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants held by being adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the temperature of the cooling water of the engine.

According to this aspect of the invention, the heating-conducting condition is given as an engine cooling water temperature condition. When the temperature of the cooling water is low, such as immediately after the start of the engine, hydrocarbons are emitted in relatively large amounts from the combustion chambers of the engine even under a normal condition. When the temperature of the cooling water of the engine is low, therefore, the fuel is supplied in a slightly increased amount compared to that when the engine is warmed up in order to increase the amount of hydrocarbons in the exhaust gas. Hydrocarbons in the exhaust gas burn on the NOx occluding and reducing catalyst upon reacting with oxygen in the exhaust gas, and contribute to raising the temperature of the NOx occluding and reducing catalyst. That is, when the temperature of the cooling water is low, the temperature of the NOx occluding and reducing catalyst can be easily raised by increasing the fuel by an amount less than that required when the temperature of the cooling water is high. According to this aspect of the invention, therefore, the heating-conducting condition is set depending upon the temperature of the cooling water, and the heating-conducting condition is widened when the temperature of the cooling water is low such as at the start of the engine, so that the heating is conducted at an increased frequency when the engine is in operation. Therefore, the state in which the contaminants are held in large amounts by the NOx occluding and reducing catalyst does not last long after the start of the engine.

According to a further aspect of the present invention, there is provided an exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants held by being adsorbed or absorbed by said NOX occluding and reducing catalyst;

a recovering means which maintains said NOx occluding and reducing catalyst within a predetermined high-temperature range for a predetermined recovering period when the holding amount of said contaminants estimated by said holding amount estimation means has reached a predetermined value, and controls the air-fuel ratio of the exhaust gas flowing into said NOx occluding and reducing catalyst to assume a recovering air-fuel ratio at which said contaminants can be released;

a recovering degree evaluation means for evaluating the degree of recovery of the action for absorbing, releasing and purifying NOx by reduction of said NOx occluding and reducing catalyst accomplished by said recovering means; and a first changing means for changing the total amount of the reducing substances in the exhaust gas flowing into said NOx occluding and reducing catalyst during the recovering period of the next time depending upon the degree of recovery evaluated by said recovering degree evaluation means.

According to this aspect of the invention, the total amount of the reducing substances flowing into the NOx occluding and reducing catalyst is adjusted during the recovering period depending upon the degree of recovery from the SOx contamination. Therefore, the total amount of the reducing substances in the exhaust gas is optimized during the recovering period, and the NOx occluding and reducing catalyst is completely recovered from the contaminated state without deteriorating the exhaust gas emission.

According to a further aspect of the present invention, there is provided an exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting decrease in the capability of absorbing, releasing and reducing the NOx as it adsorbs or absorbs contaminants in the exhaust gas;

a holding amount estimation means for estimating the amount of said contaminants held by being adsorbed or absorbed by said NOx occluding and reducing catalyst;

a recovering means which maintains said NOx occluding and reducing catalyst within a predetermined high-temperature range for a predetermined recovering period when the holding amount of said contaminants estimated by said holding amount estimation means has reached a predetermined value, and controls the air-fuel ratio of the exhaust gas flowing into said NOx occluding and reducing catalyst to assume a recovering air-fuel ratio at which said contaminants can be released;

an estimation means for estimating the concentration of precursors of said contaminants in the fuel; and a second changing means for changing the total amount of the reducing substances flowing into said NOx occluding and reducing catalyst during said recovering period depending upon the concentration of said precursors estimated by said estimation means.

According to this aspect of the invention, the second changing means adjusts the total amount of the reducing substances flowing into the NOx occluding and reducing catalyst during the recovering period depending upon the concentration of the precursors estimated by the estimation means. Therefore, the total amount of the reducing substances is optimized during the recovering period depending upon the concentration of contaminants in the exhaust gas during the recovering period, the concentration of contaminants changing depending upon the concentration of precursors of the contaminants in the fuel. It is thus made possible to completely remove the contaminant without deteriorating the exhaust gas emission.

BRIEF DESCRIPTION OF THE DRAWINGS

The present invention will be better understood from the description as set forth hereinafter with reference to the accompanying drawings in which.

DESCRIPTION OF THE PREFERRED EMBODIMENTS

Hereinafter, embodiments of the exhaust gas purification device according to the present invention will be explained with reference to FIGS. 1 through 26.

Figure 1:
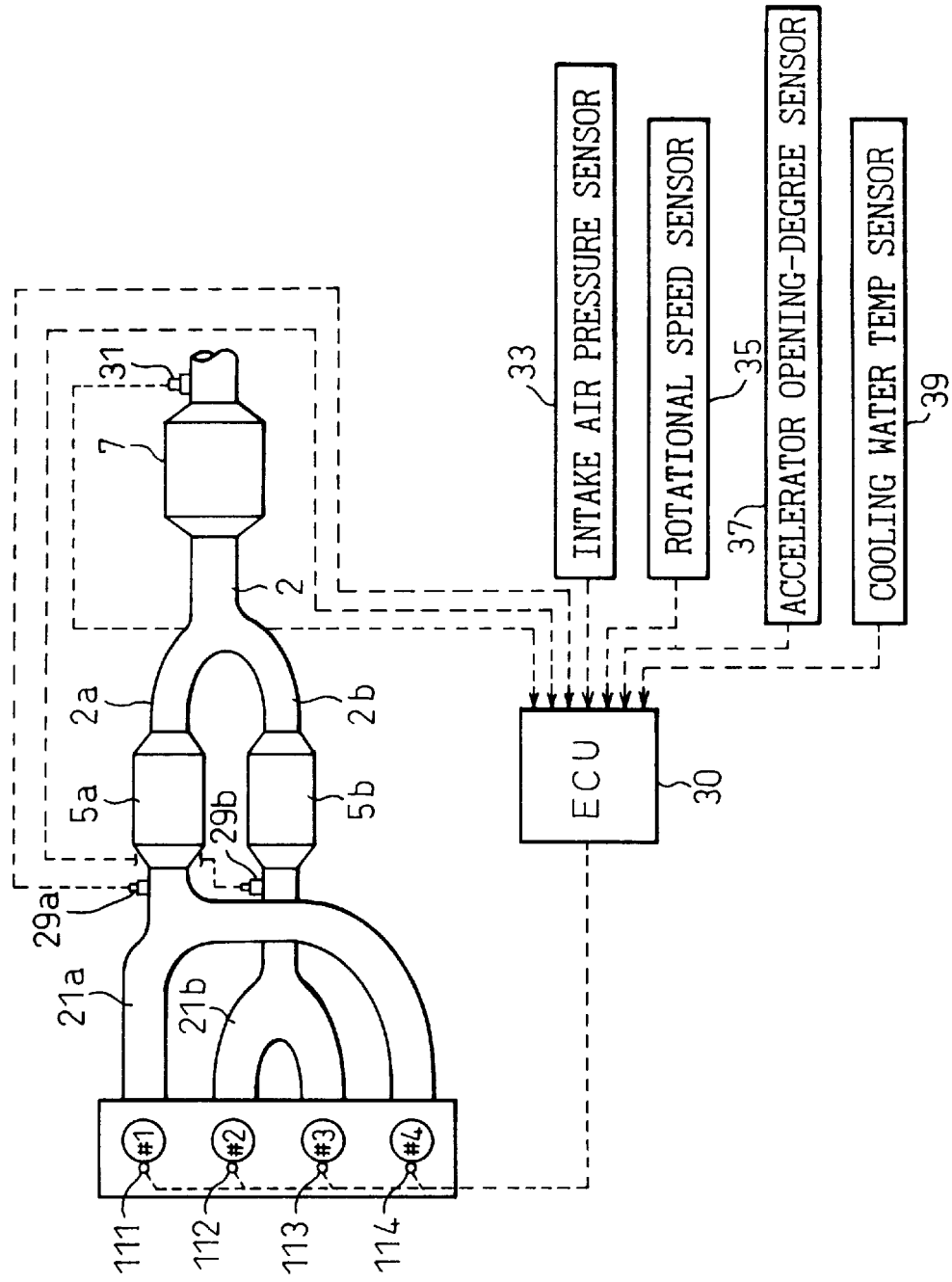
FIG. 1 is a view schematically illustrating the constitution of an embodiment in which the present invention is applied to an internal combustion engine for an automobile.

FIG. 1 is a view schematically illustrating the constitution of an embodiment in which the present invention is applied to an internal combustion engine for an automobile.

In FIG. 1, reference numeral 1 designates an internal combustion engine for an automobile. In this embodiment, the engine 1 is a four-cylinder gasoline engine having four cylinders #1 to #4 which are equipped with fuel injection valves 111 to 114 for directly injecting fuel into the cylinders. As will be described later, the internal combustion engine 1 of this embodiment is a lean burn engine that can be operated at a lean air-fuel ratio (i.e., an air-fuel ratio larger than a stoichiometric air-fuel ratio).

In this embodiment, furthermore, the cylinders #1 to #4 are grouped into two groups of cylinders each including two cylinders in which the ignition timings do not take place consecutively (in the embodiment of FIG. 1, for example, the order of igniting the cylinders is 1-3-4-2. Therefore, the cylinders #1 and #4 form one group of cylinders, and the cylinders #2 and #3 form another group of cylinders). The exhaust port of each cylinder is connected to an exhaust manifold of each group of cylinders, and is connected to an exhaust passage of each group of cylinders. In FIG. 1, reference numeral 21a denotes an exhaust manifold for connecting exhaust ports of the group of the cylinders #1 and #4 to an independent exhaust passage 2a, and 21b denotes an exhaust manifold for connecting exhaust ports of the group of the cylinders #2 and #4 to an independent exhaust passage 2b. In this embodiment, start catalysts (hereinafter referred to as "SC") 5a and 5b comprising a three-way catalyst are arranged on the independent exhaust passages 2a and 2b. The independent exhaust passages 2a and 2b meet in a common exhaust passage 2 on the downstream side of the SC.

An NOx occluding and reducing catalyst 7 that will be described later is arranged in the common exhaust passage 2. In FIG. 1, reference numerals 29a and 29b denote air-fuel sensors arranged on the upstream side of the start catalysts 5a and 5b of the independent exhaust passages 2a and 2b, and reference numeral 31 denotes an air-fuel sensor arranged at an outlet port of the NOx occluding and reducing catalyst in the exhaust passage 2. The air-fuel sensors 29a, 29b and 31 are so-called linear air-fuel sensors that produce voltage signals which change continuously, corresponding to the air-fuel ratio of an exhaust gas, over a wide range of air-fuel ratios.

In FIG. 1, furthermore, reference numeral 30 denotes an electronic control unit (ECU) of the engine 1. In this embodiment, the ECU 30 is a microcomputer of a known type having a RAM, a ROM and a CPU, and performs basic control operations such as an ignition timing control and a fuel injection control for the engine 1. In this embodiment, the ECU 30 further works as a holding amount estimation means for estimating the amount of contaminants such as SOx absorbed by the NOx occluding and reducing catalyst 7, works as a heating means for heating the NOx occluding and reducing catalyst 7, and works as a heating-conducting condition-setting means for setting the heating-conducting condition as will be described later, in addition to executing the above-mentioned basic control operations.

The input ports of the ECU 30 receive signals from the air-fuel ratio sensors 29a and 29b representing the exhaust gas air-fuel ratios at the inlet ports of the start catalysts 5a and 5b, a signal from the air-fuel ratio sensor 31 representing an exhaust gas air-fuel ratio at the outlet port of the NOx occluding and reducing catalyst 7, a signal corresponding to the intake air pressure of the engine from an intake-air-pressure sensor 33 provided in the intake manifold (not shown), and a signal corresponding to the engine rotational speed from a rotational speed sensor 35 disposed near the crank shaft (not shown) of the engine. In this embodiment, furthermore, the input ports of the ECU 30 receive a signal representing the amount the accelerator pedal is depressed by a driver (degree of accelerator opening) from an accelerator opening-degree sensor 37 disposed near an accelerator pedal (not shown) of the engine 1 and a signal representing the temperature of the cooling water from a cooling water temperature sensor 39 disposed in a cooling water passage (not shown) of the engine. The output port of the ECU 30 is connected to the fuel injection valves 111 to 114 of the cylinders to control the amount of fuel injected into the cylinders and the timings for fuel injection.

In this embodiment, the ECU 30 operates the engine 1 in the following five combustion modes depending upon the amount of fuel injection into the engine, i.e., depending upon the load exerted on the engine:

① A lean air-fuel ratio stratified charge combustion (one fuel injection in the compression stroke).

② A lean air-fuel ratio uniform mixture/stratified charge combustion (one fuel injection in the intake stroke and one fuel injection in the compression stroke).

③ A lean air-fuel ratio uniform mixture combustion (one fuel injection in the intake stroke).

④ A stoichiometric air-fuel ratio uniform mixture combustion (one fuel injection in the intake stroke).

⑤ A rich air-fuel ratio uniform mixture combustion (one fuel injection in the intake stroke).

That is, the lean air-fuel ratio stratified charge combustion ① is carried out in the light-load operation region of the engine 1. In this state, the fuel is injected into the cylinders only one time in the latter half of the compression stroke in each cylinder, and the injected fuel forms a layer of a combustible air-fuel ratio mixture near the spark plug in the cylinder. In this operation state the fuel is injected in a very small amount, and the air-fuel ratio in the cylinder as a whole is about 30 to about 20.

As the load increases from the above-mentioned state ① to enter into the low-load operation region, there takes place the above-mentioned lean air-fuel ratio uniform mixture/stratified charge combustion ②. The amount of fuel injected into the cylinder increases with an increase in the load exerted on the engine. In the above-mentioned stratified charge combustion ①, the fuel is injected in the latter half of the compression stroke, whereby the injection time is limited and limitation is imposed on the amount of fuel for forming the stratified charge. In this load region, therefore, the fuel is injected in advance in the former half of the intake stroke in an amount to compensate for the shortage of the fuel injected in the latter half of the compression stroke, thereby to supply the fuel in a target amount into the cylinder. The fuel injected into the cylinder in the former half of the intake stroke forms a very lean and uniform mixture before being ignited. In the latter half of the compression stroke, the fuel is further injected into this very lean and uniform mixture in order to form the charge of a combustible air-fuel ratio mixture near the spark plug. At the time of ignition, this combustible air-fuel ratio mixture charge starts burning, and the flame propagates to the surrounding lean mixture charge, so that the combustion takes place stably. In this state, the amount of fuel injected in the intake stroke and in the compression stroke is larger than that of the mode ①, but the air-fuel ratio as a whole is still lean (e.g., an air-fuel ratio of about 25 or smaller).

When the load on the engine further increases, the engine combustion becomes the lean air-fuel ratio uniform mixture combustion ③. In this state, the fuel is injected only one time in the former half of the intake stroke, and the amount of the injected fuel becomes larger than that of the mode ②. The uniform mixture formed in the cylinder in this state assumes a lean air-fuel ratio which is relatively close to the stoichiometric air-fuel ratio.

As the load on the engine further increases to enter into the high-load operation region of the engine, the amount of fuel becomes larger than that of the mode ③, and the engine operation becomes the stoichiometric air-fuel ratio uniform mixture operation ④. In this state, a uniform mixture of the stoichiometric air-fuel ratio is formed in the cylinder, and the engine output increases. When the load on the engine further increases to cause the full-load operation of the engine, the amount of fuel is further increased in excess of that of the mode ④, and the engine operation becomes the rich air-fuel ratio uniform mixture operation ⑤. In this state, the uniform mixture formed in the cylinder becomes a rich air-fuel ratio.

In this embodiment, optimum operation modes ① to ⑤ have been empirically set depending upon the degree of accelerator opening (amount of the accelerator pedal depressed by the driver) and the rotational speed of the engine, and a map using the degree of accelerator opening and the engine rotational speed is stored in the ROM of the ECU 30. When the engine 1 is in operation, the ECU 30 determines which one of the above-mentioned operation modes ① to ⑤ is selected based on the degree of accelerator opening detected by the accelerator opening-degree sensor 37 and the rotational speed of the engine, and determines the amount of fuel injection, the timing for fuel injection and the number of times, depending on each of the modes.

When any one of the modes ① to ③ (lean air-fuel ratio combustion) is selected, the ECU 30 determines the amount of fuel injection from the degree of accelerator opening and the rotational speed of the engine based on the maps that have been prepared in advance for the modes ① to ③. When the modes ④ or ⑤ (stoichiometric air-fuel ratio uniform mixture combustion or rich air-fuel ratio uniform mixture combustion) are selected, the ECU 30 sets the amount of fuel injection based on the intake air pressure detected by the intake air pressure sensor 33 and the rotational speed of the engine by using maps that have been prepared for the modes ④ and ⑤.

When the mode ④ (stoichiometric air-fuel ratio uniform mixture combustion) is selected, the ECU 30 corrects by feedback the amount of fuel injection calculated as described above relying on the outputs of the air-fuel sensors 29a and 29b, so that the air-fuel ratio in the exhaust gas of the engine is controlled at the stoichiometric air-fuel ratio.

In the engine 1 of this embodiment as described above, the amount of fuel injection increases with an increase in the load on the engine, and the operation mode changes depending upon the amount of fuel injection. In the following description, therefore, the amount of fuel injection is commonly used in all of these modes as a parameter representing the load on the engine.

Next, described below are the start catalysts 5a, 5b and the NOx occluding and reducing catalyst 7 according to this embodiment.

The start catalysts (SC) 5a and 5b are constituted as a three-way catalyst by using a honeycomb-shaped substrate of cordierite or the like, forming a thin coating of alumina on the surface of the substrate, and carrying a noble metal catalyst component such as platinum Pt, palladium Pd or rhodium Rh on the alumina layer. The three-way catalyst highly efficiently removes the three components, i.e., HC, CO and NOx near the stoichiometric air-fuel ratio. The three-way catalyst exhibits a decreased ability for reducing NOx when the air-fuel ratio of the exhaust gas flowing in becomes higher than the stoichiometric air ratio. When the engine 1 is operating at a lean air-fuel ratio, therefore, the three-way catalyst is not capable of removing NOx in the exhaust gas to a sufficient degree.

The start catalysts (SC) 5a and 5b are disposed in the exhaust passages 2a and 2b at positions close to the engine 1 and have a relatively small capacity to decrease their heat capacity, so that they can be heated to the activated temperature within a short period of time after the start of the engine.

Next, described below is the NOx occluding and reducing catalyst 7 according to this embodiment. The NOx occluding and reducing catalyst 7 according to this embodiment uses alumina as a substrate to carry at least one component selected from the alkali metals such as potassium K, sodium Na, lithium Li and cesium Cs, alkaline earth elements such as barium Ba and calcium Ca, and rare earth elements such as lanthanum La, cerium Ce and yttrium Y, as well as a noble metal such as platinum Pt. The NOx occluding and reducing catalyst exhibits the action of absorbing and releasing NOx, i.e., absorbing NOx ($NO_2$, NO) in the exhaust gas and holding them in the form of nitric acid ions $NO^{3-}$ when the air-fuel ratio of the exhaust gas flowing in is lean, and releases the absorbed NOx when the air-fuel ratio of the exhaust gas flowing in becomes rich.

The mechanism for absorbing and releasing NOx will be described next with reference to the case of using platinum Pt and barium Ba. The same mechanism, however, is created even when other noble metals, alkali metals, alkaline earth elements and rare earth elements are used.

When the concentration of oxygen increases in the exhaust gas that are flowing in (i.e., when the air-fuel ratio of the exhaust gas becomes larger (leaner) than the stoichiometric air-fuel ratio), oxygen in the form of $O_{2-}$ or $O^{2-}$ adheres onto platinum Pt, whereby NOx in the exhaust gas reacts with $O_{2-}$ or $O^{2-}$ on platinum Pt and forms $NO_2$. $NO_2$ in the exhaust gas and $NO_2$ thus formed are further oxidized on platinum Pt, are absorbed by the absorbing agent such as barium oxide BaO, in which they are bonded to barium oxide BaO, and are diffused in the form of nitric acid ions $NO_{3-}$ in the absorbing agent. In a lean atmosphere, therefore, NOx in the exhaust gas is absorbed in the form of nitrates by the NOx-absorbing agent.

When concentration of oxygen greatly decreases in the exhaust gas (i.e., when the air-fuel ratio of the exhaust gas becomes smaller (richer) than the stoichiometric air-fuel ratio), the amount of $NO_2$ formed on platinum Pt decreases, and the reaction proceeds in the reverse direction. This causes nitric acid ions $NO_{3-}$ in the absorbing agent to be released in the form of $NO_2$ from the absorbing agent. In this case, if the reducing components such as CO and the like as well as components such as HC, $CO_2$ and the like are included in the exhaust gas, $NO_2$ is reduced by these components on platinum Pt.

This embodiment uses the engine 1 capable of operating at a lean air-fuel ratio. When the engine 1 is operated at a lean air-fuel ratio, the NOx occluding and reducing catalyst absorbs NOx in the exhaust gas that flows in the catalyst. When the engine 1 is operated at a rich air-fuel ratio, the NOx occluding and reducing catalyst 7 releases and purities the absorbed NOx by reduction. According to this embodiment, when NOx is absorbed in increased amounts by the NOx occluding and reducing catalyst 7 during the operation at a lean air-fuel ratio, a rich-spike operation is carried out to switch the air-fuel ratio of the engine from a lean air-fuel ratio to a rich air-fuel ratio for a short period of time in order to release NOx from the NOx occluding and reducing catalyst and to purify NOx by reduction (to regenerate the NOx occluding and reducing catalyst).

In this embodiment, the ECU 30 increases or decreases the value of an NOx counter in order to estimate the amount of NOx absorbed and held by the NOx occluding and reducing catalyst 7. The amount of NOx absorbed by the NOx occluding and reducing catalyst 7 per a unit time varies in proportion to the amount of NOx in the exhaust gas flowing into the NOx occluding and reducing catalyst per a unit time, i.e., varies in proportion to the amount of NOx generated by the engine 1 per a unit time. Further, the amount of NOx generated by the engine per a unit time is determined by the amount of fuel fed to the engine, air-fuel ratio, flow rate of the exhaust gas, etc. When the operating conditions of the engine are determined, therefore, the amount of NOx absorbed by the NOx occluding and reducing catalyst can be determined. According to this embodiment, the engine operating conditions (degree of accelerator opening, engine rotational speed, amount of the intake air, intake air pressure, air-fuel ratio, amount of feeding fuel, etc.) are changed to measure the amount of NOx generated by the engine per a unit time, and the amount of NOx absorbed by the NOx occluding and reducing catalyst 7 per a unit time is stored in the ROM of ECU 30 in the form of a numerical value map using, for example, the load on the engine (amount of fuel injection) and the engine rotational speed. The ECU 30 calculates the amount of NOx absorbed by the NOx occluding and reducing catalyst per a unit time after every predetermined period of time (after every unit time) by using the load on the engine (amount of fuel injection) and the engine rotational speed, and increases the NOx counter by the amount of NOx absorbed. Therefore, the value of the NOx counter always indicates the amount of NOx absorbed by the NOx occluding and reducing catalyst 7. When the value of the NOx counter reaches a predetermined value while the engine is in operation at a lean air-fuel ratio, the ECU 30 executes the rich-spike operation in which the operation air-fuel ratio of the engine is changed to a rich air-fuel ratio for a short period of time. Therefore, NOx absorbed by the NOx occluding and reducing catalyst is released and purified by reduction. The time for maintaining the exhaust gas air-fuel ratio at a rich air-fuel ratio during the rich-spike operation is experimentally determined depending upon the type and volume of the NOx occluding and reducing catalyst. The value of the NOx counter is reset to 0 after the NOx is released from the NOx occluding and reducing catalyst and is purified by reduction upon the execution of the rich-spike operation. Upon effecting the rich-spike operation depending upon the amount of NOx absorbed by the NOx occluding and reducing catalyst 7 as described above, the NOx occluding and reducing catalyst 7 is properly regenerated and is not saturated with NOx which the catalyst has absorbed.

It is known that sulfur oxides (SOx) contained in the exhaust gas is also absorbed in the NOx occluding and reducing catalyst and forms sulfates (e.g., $BaSO_4$) by quite the same mechanism as that for absorbing NOx under lean conditions. Like NOx, the sulfates are released in the form of $SO_2$ from the NOx occluding and reducing catalyst when the air-fuel ratio of the exhaust gas becomes rich. Generally, however, the sulfates remain stable. To release SOx from the NOx occluding and reducing catalyst, however, the NOx occluding and reducing catalyst must be heated at a temperature higher than that of when NOx are to be released. Therefore, SOx are not released to a sufficient degree by the normal regenerating operation of the NOx occluding and reducing catalyst; i.e., SOx are gradually accumulated in the absorbing agent, and the amount of the absorbing agent that participates in absorbing NOx decreases. As SOx accumulate, therefore, the capacity of the NOx occluding and reducing catalyst for absorbing NOx decreases, giving rise to the occurrence of a so-called SOx contamination of the NOx occluding and reducing catalyst.

In order to recover from the SOx contamination, the NOx occluding and reducing catalyst must be maintained at a contamination-recovery temperature (e.g., 600° C. or higher) which is higher than a temperature (e.g., 250° C. or higher) at which the NOx occluding and reducing catalyst is usually regenerated to release NOx and, besides, the air-fuel ratio of the exhaust gas flowing into the NOx occluding and reducing catalyst must be maintained at an air-fuel ratio smaller than the stoichiometric air-fuel ratio (a rich air-fuel ratio).

Therefore, when the temperature of the NOx occluding and reducing catalyst is lower than the above-mentioned contamination-recovery temperature, the NOx occluding and reducing catalyst 7 must be heated to a temperature higher than the contamination-recovery temperature in order to perform SOx contamination-recovery operation. According to this embodiment as will be described later, the contamination of the NOx occluding and reducing catalyst 7 is removed by conducting two operations, i.e., a temperature-raising operation for heating the NOx occluding and reducing catalyst 7 up to the contamination-recovery temperature and a recovery operation for releasing SOx from the NOx occluding and reducing catalyst by maintaining the NOx occluding and reducing catalyst 7, after the temperature thereof is raised, in an atmosphere of a rich air-fuel ratio.

On the other hand, the temperature of the NOx occluding and reducing catalyst 7 greatly changes depending on the operating conditions of the engine (such as the exhaust gas temperature). In some operating conditions of the engine, the temperature of the NOx occluding and reducing catalyst 7 may be much lower than the above-mentioned contamination-recovery temperature. When the temperature-raising operation is carried out to heat the NOx occluding and reducing catalyst 7, energy is consumed in an increased amount to deteriorate the fuel efficiency of the engine. When the temperature of the NOx occluding and reducing catalyst 7 is much lower than the contamination-recovery temperature, therefore, the contamination-recovery operation is not executed despite the holding amount of SOx has reached a predetermined value but, instead, it must wait until the temperature of the NOx occluding and reducing catalyst rises to near the contamination-recovery temperature depending upon a change in the engine operating conditions, so that the fuel efficiency will not be deteriorated.

Here, however, if the temperature range in which the temperature-raising operation for the NOx occluding and reducing catalyst 7 is carried out is fixed, the contamination-recovery operation will not be executed even if holding amount of SOx is increased when the engine is operated for extended periods of time under the operating conditions in which the catalyst temperature lies outside the above-mentioned temperature range. Therefore, the amount of SOx held by the NOx occluding and reducing catalyst continues to increase. If the holding amount of SOx continues to increase, the NOx-absorbing capacity of the NOx occluding and reducing catalyst 7 decreases, and the catalyst is saturated with NOx after it has absorbed NOx in only small amounts. Therefore, unpurified NOx is released into the open air when the engine is in operation.

According to this embodiment, therefore, the range of the catalyst temperature in which the temperature-raising operation is conducted is expanded with an increase in the amount of SOx held by the NOx occluding and reducing catalyst 7, in order to prevent the NOx occluding and reducing catalyst from being saturated. Thus, the range of the catalyst temperature in which the temperature-raising operation is conducted is expanded with an increase in the amount of SOx held by the NOx occluding and reducing catalyst, and the contamination-recovery operation is executed even at a low catalyst temperature. Therefore, the contamination-recovery operation is executed when the holding amount of SOx increases to some extent despite the engine being continuously operated under such operating conditions that the catalyst temperature remains low, and the NOx occluding and reducing catalyst recovers its absorbing capacity. Thus, the NOx occluding and reducing catalyst is not saturated, and unpurified NOx is prevented from being released.

Figure 2:
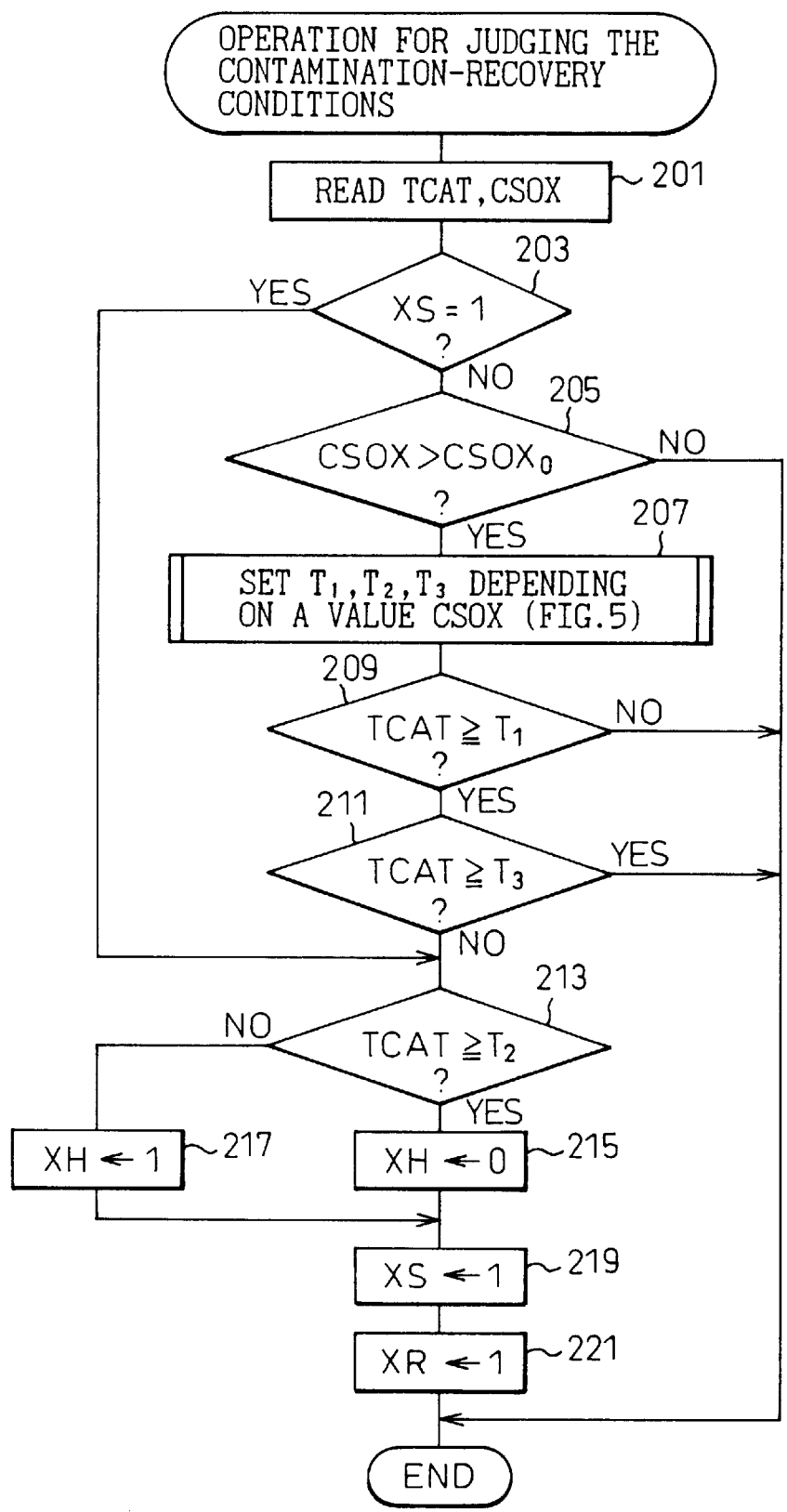
FIG. 2 is a flowchart explaining an embodiment of the operation for judging the contamination-recovery conditions for an NOx occluding and reducing catalyst.

FIG. 2 is a flowchart explaining the operation for judging the contamination-recovery conditions for the NOx occluding and reducing catalyst 7 according to this embodiment. This operation is conducted as a routine executed by the ECU 30 after every predetermined period of time.

In this operation, the ECU 30 judges whether the temperature-raising operation (heating operation) and the recovery operation for the NOx occluding and reducing catalyst that will be described later can be executed or not based on the SOx-holding amount CSOX of the NOx occluding and reducing catalyst 7 and the temperature TCAT of the NOx occluding and reducing catalyst, and sets the conditions for executing the temperature-raising operation depending upon the SOx-holding amount CSOX of the NOx occluding and reducing catalyst 7.

Figure 4:
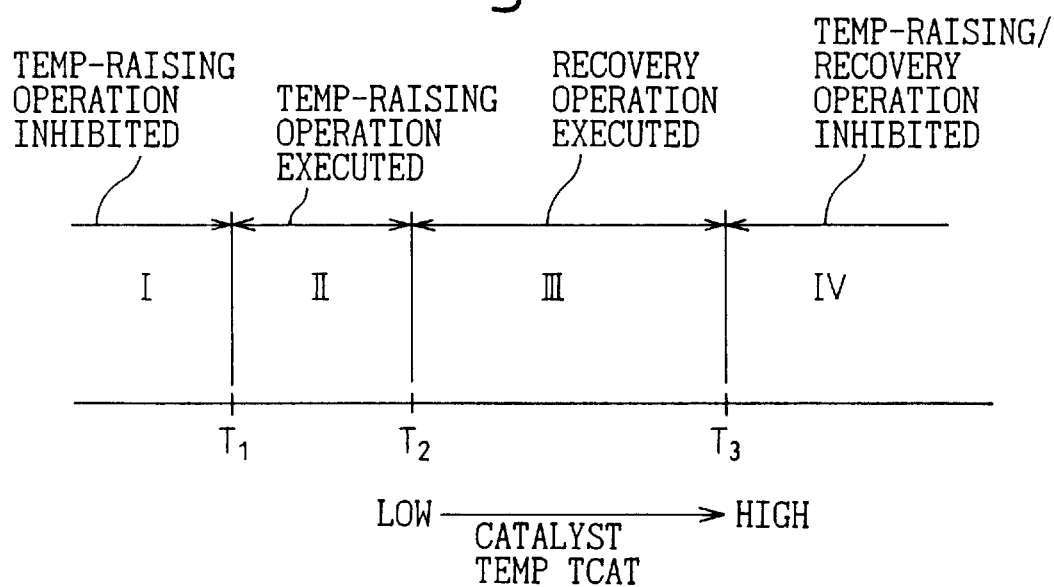
FIG. 4 is a diagram illustrating the judged catalyst temperatures for executing the temperature-raising and recovery operations of FIG. 2.

According to this embodiment as described above, when the SOx-holding amount CSOX of the NOx occluding and reducing catalyst 7 becomes greater than a predetermined amount $CSOX_0$, it is judged whether the temperature-raising operation and the recovery operation can be executed or not depending upon the temperature TCAT of the NOx occluding and reducing catalyst 7. FIG. 4 is a diagram illustrating the catalyst temperature TCAT and the values for judging whether the temperature-raising/recovery operations be executed for the NOx occluding and reducing catalyst 7 according to the embodiment. In FIG. 4, symbol $T_1$ denotes a lower-limit temperature for permitting the execution of the temperature-raising operation, $T_2$ denotes a lower-limit temperature for permitting the execution of the recovery operation and $T_3$ denotes an upper-limit temperature for permitting the execution of the recovery operation. According to this embodiment as shown in FIG. 4, therefore, neither the temperature-raising operation nor the recovery operation is executed in the catalyst temperature regions of TCAT<$T_1$ (region I in FIG. 4) and TCAT$\geq T_3$ (region IV in FIG. 4) despite SOx are held in increased amounts. Both the temperature-raising operation and the recovery operation are executed in the catalyst temperature region of $T_1 \leq$ TCAT<$T_2$ (region II in FIG. 4), and the recovery operation only is executed in the catalyst temperature region of $T_2 \leq$ TCAT<$T_3$ (region III in FIG. 4). In this embodiment as will be described later, the operating air-fuel ratio of the engine 1 is controlled to increase HC, CO and oxygen in the exhaust gas flowing into the NOx occluding and reducing catalyst in order to execute the operation for raising the temperature of the NOx occluding and reducing catalyst. When the catalyst temperature is low, therefore, an increased period of time is required for raising the temperature, and the fuel efficiency and the quality of exhaust gas of the engine are often deteriorated. In this embodiment, therefore, when the catalyst temperature TCAT is lower than the lower-limit value $T_1$, the contamination-recovery operation (temperature-raising/recovery operation) is not executed, so that the fuel efficiency and the quality of exhaust gas will not be deteriorated. When the recovery operation is executed according to this embodiment, furthermore, exhaust gas of a rich air-fuel ratio close to the stoichiometric air-fuel ratio is fed to the catalyst. When the catalyst temperature is high, therefore, execution of the recovery operation may often cause the catalyst temperature to be excessively raised due to oxidation of HC and CO in the exhaust gas. In this embodiment, therefore, the contamination-recovery operation is not executed when the catalyst temperature is higher than the upper-limit value $T_3$ in order to prevent the catalyst from overheating.

Figure 5:
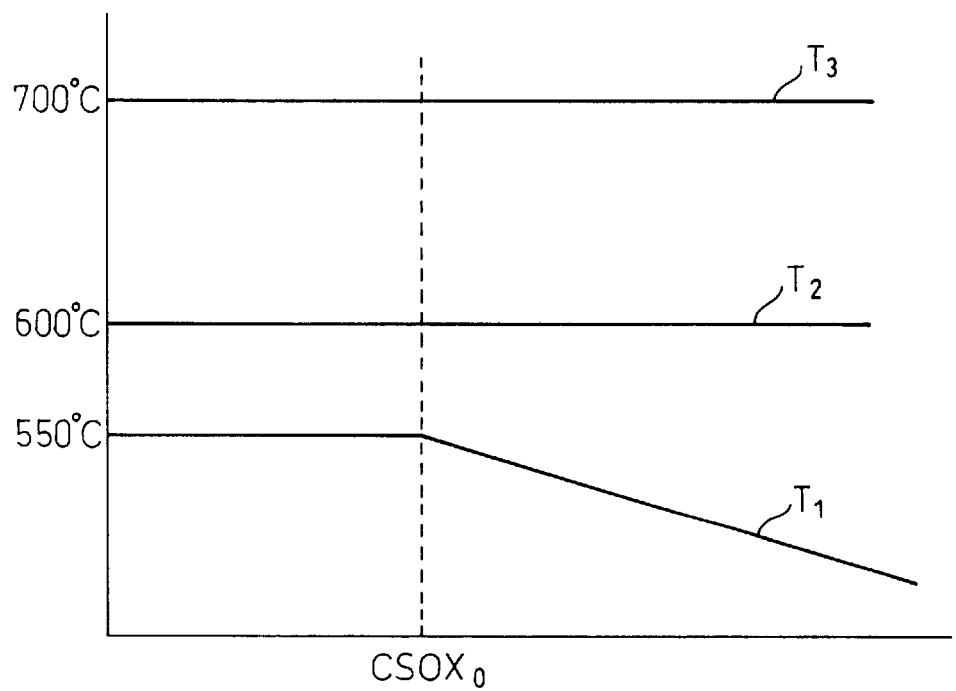
FIG. 5 is a diagram illustrating how to set the catalyst temperatures for judgement of FIG. 4.

FIG. 5 is a diagram illustrating a relationship between the temperature-judging values $T_1$, $T_2$, $T_3$ and the SOx-holding amount CSOX of the NOx occluding and reducing catalyst according to the embodiment. In this embodiment as shown in FIG. 5, $T_3$ and $T_2$ are set to remain constant ($T_3 \approx 700°$ C., $T_2 \approx 600°$ C.) irrespective of the SOx-holding amount CSOX. The lower-limit value $T_1$ for executing the temperature-raising operation is set to remain constant ($T_1 \approx 550°$ C.) over a range of CSOX$\leq CSOX_0$ but is set to decrease with an increase in the SOx-holding amount CSOX over a range of CSOX>$CSOX_0$. Therefore, as the amount of SOx held by the NOx occluding and reducing catalyst increases, the contamination-recovery operation is executed even at a low catalyst temperature, and the absorbing capacity of the NOx occluding and reducing catalyst is prevented from decreasing. In this embodiment, the value $T_3$ remains constant irrespective of the value CSOX. The value $T_3$, however, may be set to increase with an increase in the value CSOX over the range of CSOX>$CSOX_0$ contrary to $T_1$ in order to expand the region for executing the contamination-recovery operation.

Next, described below is the operation for judging the contamination-recovery conditions of FIG. 2.

When the operation starts in FIG. 2, the catalyst temperature TCAT and the amount of SOx CSOX held by the NOx occluding and reducing catalyst 7 are read at a step 201. This embodiment uses an SOx counter CSOX for estimating the amount of SOx absorbed and held by the NOx occluding and reducing catalyst 7. The amount of SOx absorbed by the NOx occluding and reducing catalyst 7 per a unit time is proportional to the amount of SOx in the exhaust gas flowing into the NOx occluding and reducing catalyst per a unit time, i.e., proportional to the amount of SOx generated by the engine 1 per a unit time. On the other hand, the amount of SOx generated by the engine per a unit time is determined by the operating conditions of the engine (amount of feeding the fuel). When the operating conditions of the engine are determined, therefore, it is possible to know the amount of SOx absorbed by the NOx occluding and reducing catalyst. According to this embodiment, the amount of SOx generated by the engine per a unit time is measured under various engine operating conditions (degree of accelerator opening, engine rotational speed, amount of the intake air, intake air pressure, air-fuel ratio, amount of feeding fuel, etc.), and the amount of SOx absorbed by the NOx occluding and reducing catalyst 7 per a unit time is calculated and is stored in the ROM of ECU 30 in the form of a numerical value map using, for example, load on the engine (amount of fuel injection) and the engine rotational speed as parameters. The ECU 30 calculates the amount of SOx absorbed by the NOx occluding and reducing catalyst per a unit time at predetermined intervals (every unit time) by using the load on the engine (amount of fuel injection) and the engine rotational speed, and increases the SOx counter by the calculated amount of SOx. Therefore, the value CSOX always indicates the amount of SOx held by the NOx occluding and reducing catalyst 7.

The temperature TCAT of the NOx occluding and reducing catalyst 7 may be directly detected by disposing a temperature sensor on a catalyst bed of the catalyst 7 or may be estimated from the operating conditions of the engine. A change in the temperature of the NOx occluding and reducing catalyst 7 per a unit time is determined by the difference between the catalyst temperature and the exhaust gas temperature and the flow rate of the exhaust gas. Therefore, if the catalyst temperature when the engine started (i.e., an initial catalyst temperature) is known, the catalyst temperature can be sequentially calculated by adding the amount of the change in the catalyst temperature per a unit time to the initial catalyst temperature. Further, it can be assumed that the catalyst temperature is nearly the same as the engine cooling water temperature when the engine is started. Therefore, the catalyst temperature can be obtained by repeating the calculation in which the amount of the change in the catalyst temperature per a unit time and the catalyst temperature after the temperature change is calculated periodically (at every unit time) after the engine started, using the cooling water temperature as an initial value of the catalyst temperature.

After TCAT and CSOX are read at the step 201, a value of a flag XS is judged at a step 203 in regard to whether the contamination-recovery operation is now being executed or not. When XS=1 (being executed), the routine proceeds to a step 213 that will be described later. When the contamination-recovery operation is not being executed, the routine proceeds to a step 205 where it is judged whether the SOx-holding amount CSOX is increasing in excess of a predetermined value $CSOX_0$ or not. When $CSOX \leq CSOX_0$ at the step 205, the amount of SOx held by the NOx occluding and reducing catalyst 7 is small, and there is no need to execute the contamination-recovery operation. Therefore, the routine ends without executing a step 207 and subsequent steps.

When $CSOX > CSOX_0$, on the other hand, the routine proceeds to the step 207, and the temperature-judging values $T_1$, $T_2$ and $T_3$ are set from the relationship of FIG. 5 based on the value CSOX. At steps 209 and 211, the catalyst temperature is compared with $T_1$ and $T_2$. When $TCAT < T_1$ (step 209) and $TCAT \leq T_3$ (step 211), the routine ends without executing the contamination-recovery operation. When $T_1 \leq TCAT < T_3$, the routine proceeds to a step 213.

At the step 213, it is determined whether the operation for raising the temperature of the catalyst should be executed based on the present catalyst temperature TCAT. That is, when the present catalyst temperature TCAT is not lower than the judging value $T_2$, the value of the temperature-raising operation execution flag XH is set to 0 (step 215). When TCAT is not lower than $T_2$, the value of the flag XH is set to 1 (step 217). When the value of the flag XH is set to 1, the operation for raising the temperature of the catalyst 7 (step 303 in FIG. 3) is executed in the temperature-raising/recovery operation (FIG. 3) that will be described later. In this embodiment, when the contamination-recovery operation is being executed (XS=1 at the step 203), the operations of the steps 205 to 211 are not executed. However, the operations of the step 213 and of the subsequent steps are executed even when the contamination-recovery operation is being executed. Thus, when the catalyst temperature TCAT becomes lower than $T_2$, the value of the flag XH is set to 1 and the operation is executed for raising the temperature of the catalyst despite the contamination-recovery operation being executed.

After the end of the step 215 or 217, the contamination-recovery operation execution flag XS and the recovery operation execution flag XR are set to 1 at the steps 219 and 221, respectively, and the routine ends.

Figure 3:
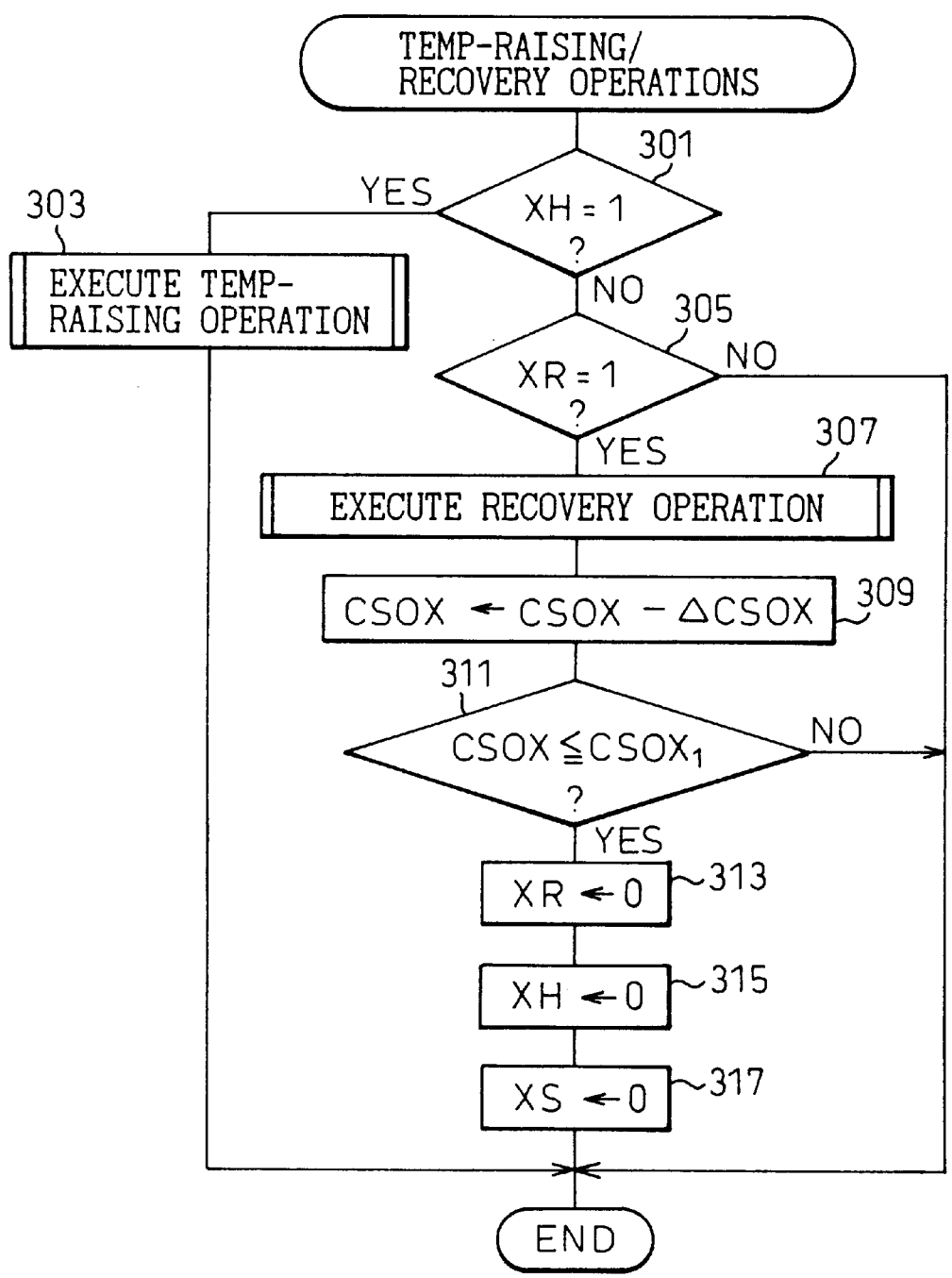
FIG. 3 is a flowchart explaining an embodiment of the temperature-raising and recovery operations for the NOx occluding and reducing catalyst.

FIG. 3 is a flowchart illustrating the temperature-raising/recovery operation for the NOx occluding and reducing catalyst 7 according to the embodiment. The operation is conducted as a routine executed by the ECU 30 at predetermined intervals.

At a step 301 in FIG. 3, it is judged whether the value of the temperature-raising operation execution flag XH is 1. When XH=1 (temperature-raising operation is being executed), the routine proceeds to a step 303 where the temperature-raising operation is executed, and the routine ends. When XH=0 (catalyst temperature is not lower than $T_2$ at the step 213 of FIG. 2, and there is no need to conduct the temperature-raising operation), operations of a step 305 and of subsequent steps are executed.

In this embodiment, the group of cylinders #1 and #4 are operated at an air-fuel ratio (e.g., about 16.5) which is considerably lean compared to the stoichiometric air-fuel ratio, the group of cylinders #2 and #3 are operated at an air-fuel ratio (e.g., about 12) which is considerably rich compared to the stoichiometric air-fuel ratio, and the exhaust gas of a lean air-fuel ratio from the exhaust passage 21a and the exhaust gas of a rich air-fuel ratio from the exhaust gas passage 2b meet together in the common exhaust passage 2 to raise the temperature of the NOx occluding and reducing catalyst 7. The ECU 30 calculates the amounts of fuel injection for bringing the combustion air-fuel ratios in the cylinders to the above-mentioned values by using relationships that have been found through experiments based on the operating conditions of the engine (degree of accelerator opening, engine rotational speed, amount of the air taken in, intake air pressure, air-fuel ratio, amount of fuel fed, etc.), and injects the fuel of such amounts into the cylinders. By operating the cylinders #2 and #3 at a considerably rich air-fuel ratio, exhaust gases from the cylinders #2 and #3 contain HC and CO in large amounts. Since the cylinders #1 and #4 are operated at a considerably lean air-fuel ratio, exhaust gases from the cylinders #1 and #4 contain oxygen in large amounts. Therefore, the exhaust gases after being mixed at the exhaust passage 2 as a whole have a rich air-fuel ratio close to the stoichiometric air-fuel ratio (about 14.25), but contain large amounts of HC, CO and oxygen compared to those of when all cylinders are operated at an air-fuel ratio of the gases after meeting together at the exhaust passage 2. Hence, HC and CO are actively oxidized on the NOx occluding and reducing catalyst, and the temperature of the NOx occluding and reducing catalyst is raised due to the heat of reaction.

In adjusting the air-fuel ratios for the cylinders, the degree of throttle valve opening of the engine 1 and the ignition timings for the cylinders may be adjusted together with the amount of fuel injection in order to prevent fluctuation in the output of the engine caused by changes in the air-fuel ratios.

When the catalyst temperature reaches $T_2$ (XH=1) at the step 301, on the other hand, the routine proceeds to a step 305 where the value of the recovery operation execution flag XR is judged. When XR=0, the routine ends without executing the operations of step 307 and of subsequent steps. That is, the recovery operation is not executed. When XR=1 at the step 305, the routine proceeds to the step 307 where the recovery operation is executed.

When the recovery operation is being executed in this embodiment, all cylinders of the engine 1 are operated at an air-fuel ratio which is slightly rich compared to the stoichiometric air-fuel ratio (e.g., about 14.25). Therefore, the NOx occluding and reducing catalyst 7 is maintained at a high temperature and in an atmosphere of a rich air-fuel ratio, permitting the absorbed SOx to be released from the NOx occluding and reducing catalyst. At a step 309, the operation is carried out for subtracting the SOx counter. While the recovery operation is being executed, SOx are released from the NOx occluding and reducing catalyst, and the amount of SOx held by the catalyst 7 decreases. At step 309, therefore, the value of the SOx counter CSOX is decreased by a predetermined value $\Delta$CSOX for every execution of the step 309 after the contamination-recovery operation has been started. The value $\Delta$CSOX represents the amount of SOx released from the NOx occluding and reducing catalyst by the contamination-recovery operation per a unit time (an interval executing the operation in FIG. 3). Even during the execution of the recovery operation, therefore, a value of the SOx counter CSOX correctly represents the amount of SOx held by the NOx occluding and reducing catalyst 7.

At a step 311, conditions for ending the recovery operation are judged. In this embodiment, it is judged that the recovery operation has ended when the amount CSOX of SOx held by the NOx occluding and reducing catalyst 7 has decreased to a value smaller than a predetermined value $CSOX_1$ during the recovery operation. Here, the predetermined value $CSOX_1$ is smaller than $CSOX_0$ (step 205 in FIG. 2). In this embodiment, the predetermined value $CSOX_1$ is, for example, set to be $CSOX_1 \approx 0$. That is, when $CSOX > CSOX_1$ at the step 311, the routine ends without executing the operations of the step 313 and of the subsequent steps, and the recovery operation continues. When the amount of SOx held by the catalyst 7 becomes smaller than $CSOX_1$ at the step 311, values of the recovery operation execution flag XR, temperature-raising operation execution flag XH and contamination-recovery operation execution flag XS are set to 0 at the steps 313 to 317, respectively. From the next time, therefore, the operation of FIG. 2 ends immediately after the operations of the steps 201 to 205 are executed. Since the values of the flags XH and XR are set to 0, the temperature-raising operation (step 303) and the recovery operation (step 309) of FIG. 3 are not executed, and the engine 1 is operated at a normal lean air-fuel ratio.

In this embodiment, when the catalyst temperature becomes lower than $T_2$ irrespective of the holding amount of SOx (steps 213, 217 in FIG. 2), the temperature-raising operation (step 303 in FIG. 3) is executed to raise the catalyst temperature thereby to carry out the recovery operation (step 307 in FIG. 3). When the catalyst temperature has dropped during the recovery operation, however, the flags XH, XR and XS may be readily set to 0 instead of raising the temperature to discontinue the contamination-recovery operation. In this case, when the amount of SOx remaining on the NOx occluding and reducing catalyst is larger than the judging value $CSOX_0$ at the time when the contamination-recovery operation is discontinued, operations of the step 207 and of subsequent steps of FIG. 2 are executed again to resume the contamination-recovery operation. When the remaining amount of SOx is smaller than $CSOX_0$, however, the contamination-recovery operation is not executed until the amount of SOx held by the catalyst 7 reaches $CSOX_0$. Thus, when the amount of SOx held by the catalyst 7 is relatively small, the contaminant is not removed by raising the catalyst temperature again, and the fuel is not wastefully consumed and the exhaust gas is not deteriorated.

Another embodiment of the present invention will now be described with reference to FIGS. 6 to 9. In the above-mentioned embodiment, the conditions for executing the contamination-recovery operation were set based on the catalyst temperature TCAT. The catalyst temperature, however, has an intimate relationship with the operating condition of the engine 1. That is, the catalyst temperature becomes high in a state where the load on the engine is large and the exhaust gas temperature is high. The catalyst temperature becomes low in a state where the load on the engine is small and the exhaust gas temperature is low. According to this embodiment, therefore, the conditions for executing the contamination-recovery operation are judged based on the engine load conditions (intake air pressure, engine rotational speed) instead of judging the conditions for executing the contamination-recovery operation based on the catalyst temperature TCAT, and the engine load conditions for executing the operation for raising the catalyst temperature are changed depending upon the amount of SOx CSOX held by the NOx occluding and reducing catalyst 7.

Figure 8:
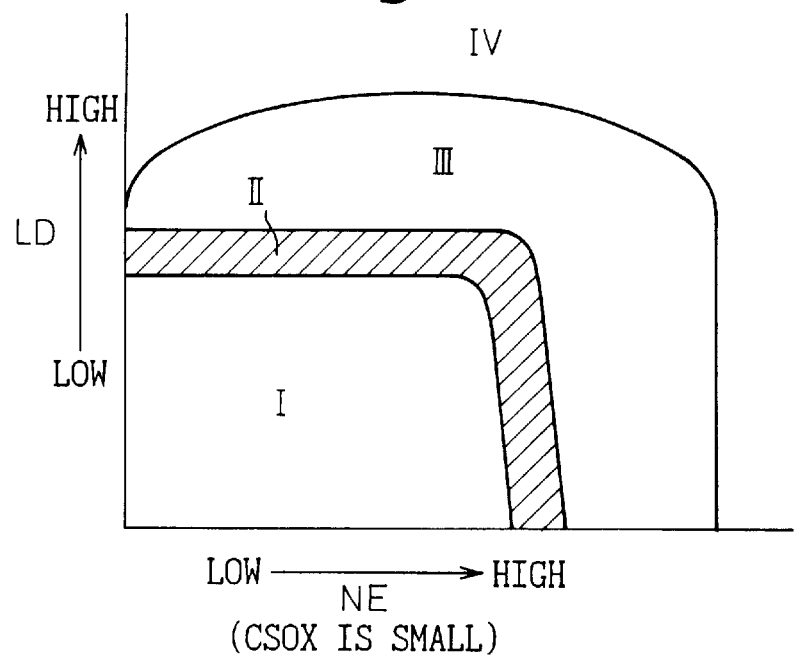
FIG. 8 is a diagram illustrating the engine operating conditions for executing the temperature-raising and recovery operations according to the embodiment of FIG. 6.
Figure 9:
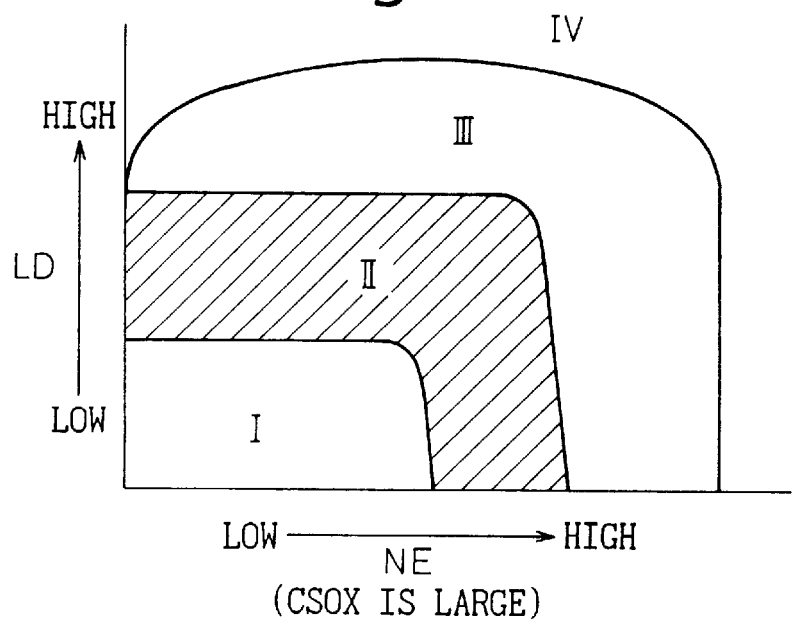
FIG. 9 is a diagram illustrating the engine operating conditions for executing the temperature-raising and recovery operations according to the embodiment of FIG. 6.

FIGS. 8 and 9 illustrate examples for setting the conditions for judging the execution of the contamination-recovery operation according to this embodiment. In FIGS. 8 and 9, the ordinate represents the load LD on the engine (corresponds to the amount of fuel injection determined from the degree of accelerator opening and the engine rotational speed), the abscissa represents the engine rotational speed NE, and the regions I to IV correspond to the regions I to IV of FIG. 4. FIG. 8 illustrates the execution judging conditions of when the amount of SOx CSOX held by the NOx occluding and reducing catalyst 7 is relatively small, and FIG. 9 illustrates the execution judging conditions of when CSOX is relatively large. In this embodiment, too, the region III (operation region where the recovery operation only is executed) and the region IV (where the contaminant is not removed to prevent the catalyst from overheating) remain constant irrespective of the value CSOX. However, the region II (where the catalyst temperature-raising operation is executed to remove contaminant) expands toward the low-load region with an increase in the holding amount of SOx CSOX. In this embodiment, too, therefore, the frequency for executing the contamination-recovery operation increases with an increase in the amount of SOx held by the NOx occluding and reducing catalyst 7, preventing the absorbing capacity of the NOx occluding and reducing catalyst from being decreased by an increase in the holding amount of SOx.

Figure 6:
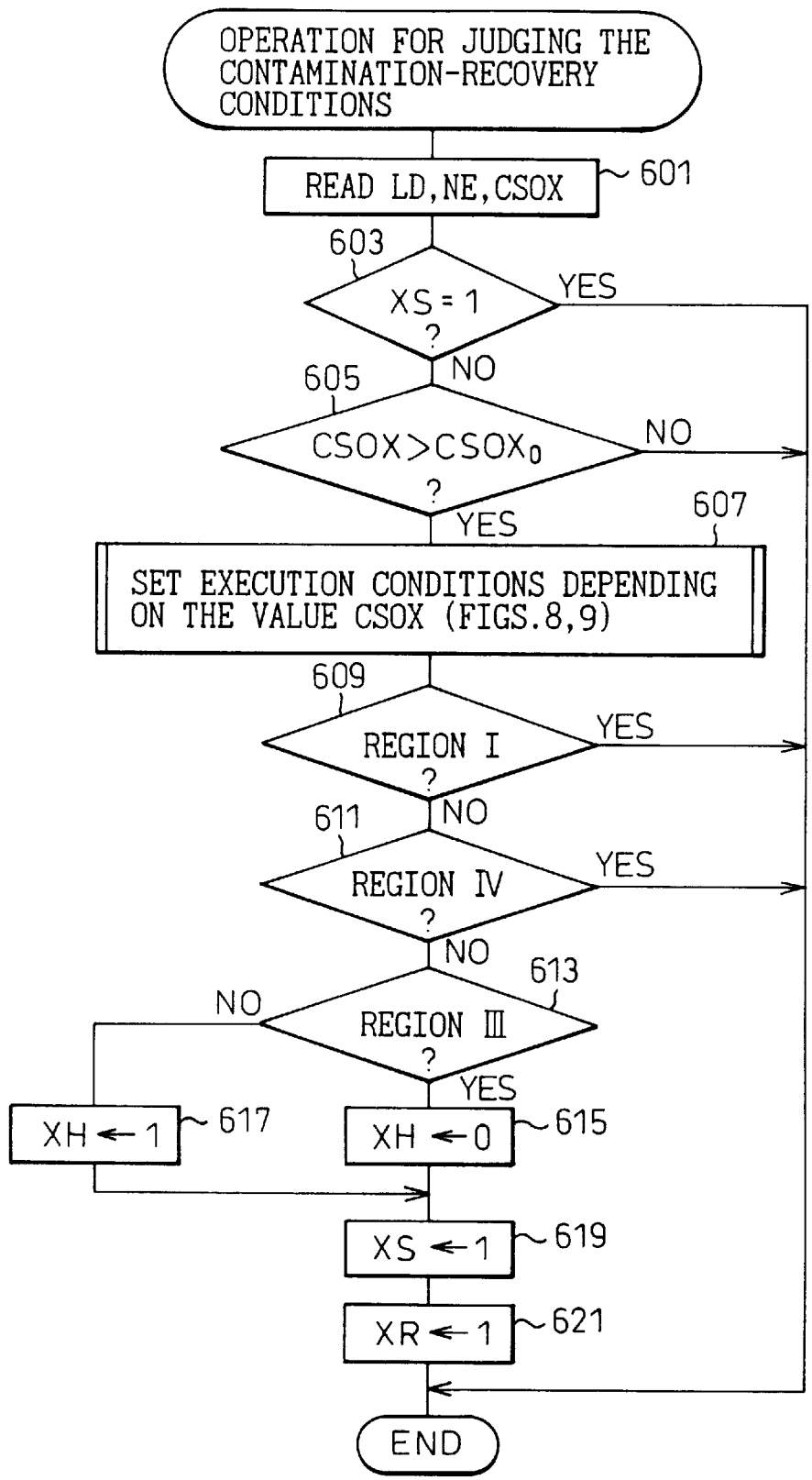
FIG. 6 is a flowchart explaining the operation for judging the contamination-recovery conditions for the NOx occluding and reducing catalyst according to an embodiment different from that of FIG. 2.
Figure 7:
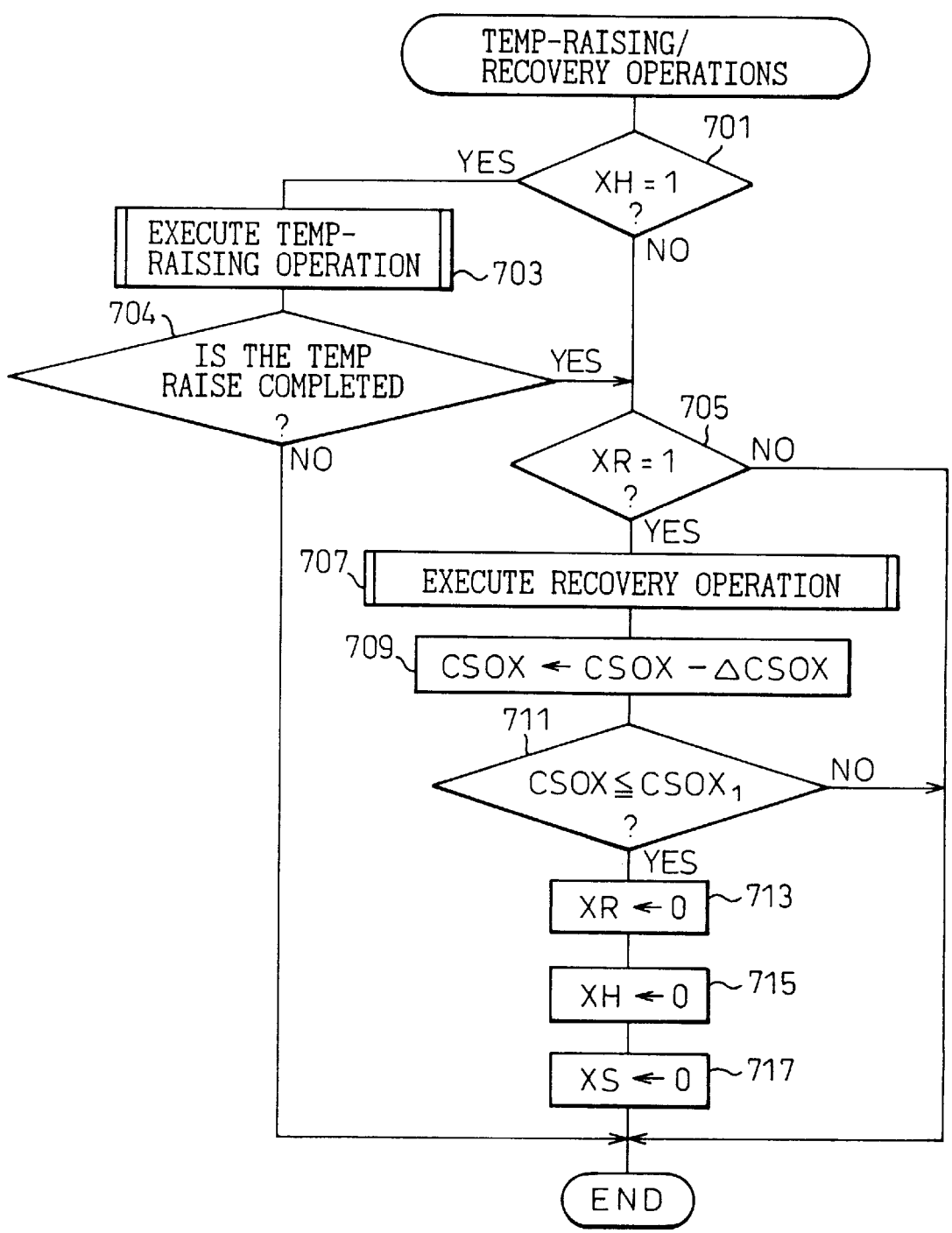
FIG. 7 is a flowchart explaining the temperature-raising and recovery operations according to the embodiment of FIG. 6.

FIGS. 6 and 7 are flowcharts explaining the operation for judging the contamination-recovery conditions of the NOx occluding and reducing catalyst 7 and the temperature-raising/recovery operations according to the embodiment. These operations are conducted as routines executed by the ECU 30 at predetermined intervals.

In FIGS. 6 and 7, there are executed the operations similar to those of FIGS. 2 and 3 of the above-mentioned embodiment.

In FIG. 6, the engine load LD (amount of fuel injection), the engine rotational speed NE, and the amount CSOX of SOx held by the NOx occluding and reducing catalyst 7 are read at a step 601, a value of the contamination-recovery operation execution flag XS is judged at a step 603, and a value of the holding amount of SOx CSOX is judged at a step 605. At a step 607, the contamination-recovery operation execution conditions (FIGS. 8 and 9) are set depending upon the value of the holding amount CSOX of SOx. At steps 609, 611 and 613, furthermore, it is judged in which one of the regions I to IV, in FIGS. 8 and 9, the present engine operating condition (catalyst temperature) lies. Depending on the operation regions, it is judged whether the contamination-recovery operation be executed or not (steps 609, 611) and the temperature-raising operation be executed or not (step 613). In this embodiment, when the contamination-recovery operation is once executed at the step 605, the operations of the step 607 and of the subsequent steps are not executed, and the contamination-recovery operation is continued irrespective of a change in the operating conditions.

In the operation of FIG. 7, a step 704 is added to the operation of FIG. 3. After the temperature-raising operation (step 703) is executed, it is judged at step 704 whether the increase in the catalyst temperature is completed. The operation in FIG. 7 is different from the operation in that, when it is judged that the temperature increase is completed, the routine proceeds to a step 705. At the step 704, it is judged that the temperature increase of the catalyst 7 is completed when a predetermined period of time has passed after the start of the temperature-raising operation. Other steps of FIGS. 6 and 7 are the same as the operations of FIGS. 2 and 3, and are not described here in detail.

Next, described below is a further embodiment of the present invention. In the above-mentioned embodiment, the conditions for judging the execution of the contamination-recovery operation were set depending upon the amount CSOX of SOx held by the catalyst. The embodiment described below, however, is different with respect to that the conditions for judging the execution of the contamination-recovery operation are set depending upon the history of the past operating conditions of the engine.

Figure 10:
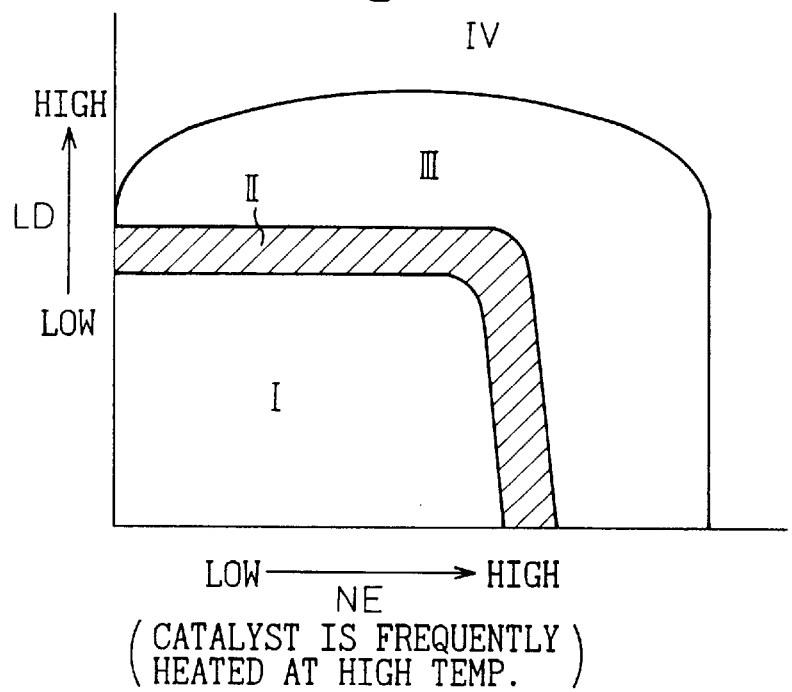
FIG. 10 is a diagram illustrating the engine operating conditions for executing the temperature-raising and recovery operations according to the embodiment of FIG. 12.
Figure 11:
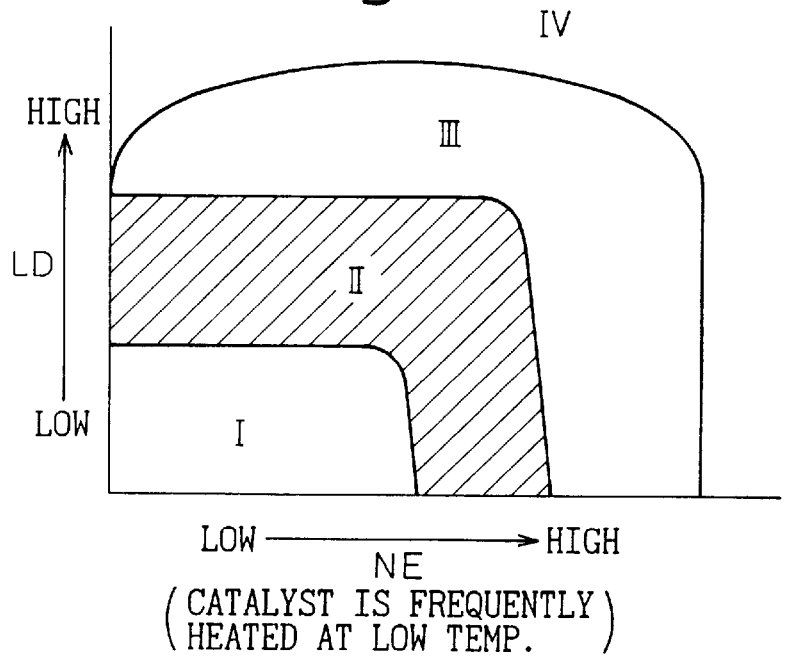
FIG. 11 is a diagram illustrating the engine operating conditions for executing the temperature-raising and recovery operations according to the embodiment of FIG. 12.

FIGS. 10 and 11 illustrate examples for setting the conditions for judging the execution of the contamination-recovery operation according to this embodiment. FIGS. 10 and 11 illustrate the cases where the conditions for judging the execution of the contamination-recovery operation are set depending on the engine load conditions in the same manner as in FIGS. 8 and 9. In FIGS. 10 and 11, the regions I to IV correspond to the regions I to IV of FIG. 4. FIG. 10 illustrates the judging conditions when the engine is operated frequently placing the catalyst in the high-temperature conditions from the past history of operation, and FIG. 11 illustrates the judging conditions when the engine is operated frequently placing the catalyst in the low-temperature conditions from the past history of operation. When the engine is operated frequently placing the catalyst in the high-temperature conditions, the frequency for executing the contamination-recovery operation does not decrease despite the region II (where the catalyst temperature-raising operation is executed) being set to be relatively narrow (despite the lower-limit catalyst temperature for executing the temperature-raising operation is set to be relatively high). When the region II is set to be narrow in the case where the engine is operated frequently placing the catalyst in the low-temperature conditions, on the other hand, the frequency for executing the contamination-recovery operation decreases, and the absorbing capacity of the NOx occluding and reducing catalyst 7 is likely to decrease. In this embodiment, therefore, when the engine is operated frequently placing the catalyst in the low-temperature conditions from the past history of operation (FIG. 11), the region II (where the temperature-raising operation is executed) is expanded toward the small-load side compared with when the engine is operated frequently placing the catalyst in the high-temperature conditions (FIG. 10). Therefore, even when the engine is operated frequently placing the catalyst in the low-temperature conditions, the frequency for executing the contamination-recovery operation increases, making it possible to prevent a decrease in the absorbing capacity of the NOx occluding and reducing catalyst irrespective of the operating conditions of the engine.

Figure 12:
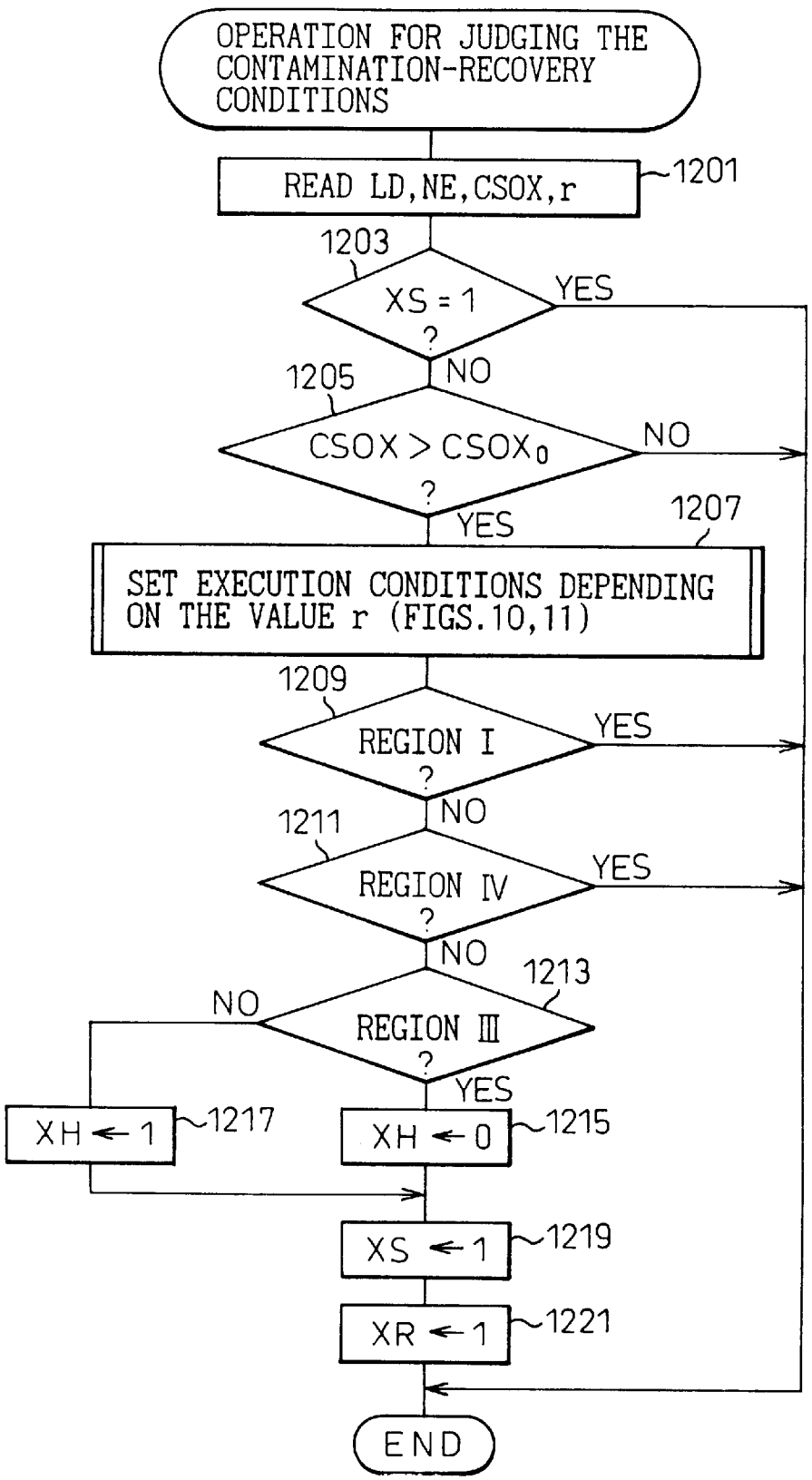
FIG. 12 is a flowchart explaining the operation for judging the contamination-recovery conditions for the NOx occluding and reducing catalyst according to an embodiment different from those of FIGS. 2 and 6.

Next, described below is how to judge the past history of operation. This embodiment calculates an integrated value th of the time in which the engine is operated in the state of, for example, region II of FIG. 10, and calculates a ratio r=th/ta of the integrated value th to the total operation time ta of the engine. When the ratio r exceeds a predetermined value $r_0$ ($0 \leq r_0 \leq 1$) (i.e., when it is considered that the frequency for executing the contamination-recovery operation does not decrease despite the judging value of FIG. 10 is used), the judging value of FIG. 10 is used. When the ratio r is not larger than $r_0$ (i.e., when it is considered that use of the judging value of FIG. 10 causes the frequency for executing the contamination-recovery operation to decrease), the judging value of FIG. 11 is used instead of the judging value of FIG. 10. Thus, the condition for executing the contamination-recovery operation expands to prevent a decrease in the frequency for executing the contamination-recovery operation. FIG. 12 is a flowchart explaining the operation for judging the contamination-recovery conditions according to this embodiment. The operation is conducted as a routine executed by the ECU 30 at predetermined intervals.

A flowchart of FIG. 12 is the same as the flowchart of FIG. 6 except that a parameter r representing the history of the engine operation is read in addition to the engine load LD, NE and CSOX at a step 1201, and either the judging condition of FIG. 10 or FIG. 11 is selected at a step 1207 depending upon the value r (depending on whether $r \leq r_0$). Therefore, this flowchart is not described here in detail. In this embodiment, too, the temperature raising/recovery operations of FIG. 7 are executed as in the above-mentioned embodiment.

Described below is a further embodiment of the present invention. In this embodiment, the conditions for executing the contamination-recovery operation are set depending upon the properties of the fuel of the engine and, particularly, on the sulfur content of the fuel. When a fuel containing a sulfur component in large amounts is used for the engine, the amount of SOx increases correspondingly in the exhaust gas, and the amount of SOx held by the NOx occluding and reducing catalyst increases at an increased rate. When the fuel containing large amounts of a sulfur component is used, therefore, the contamination-recovery operation must be executed at an increased frequency compared with when the fuel containing sulfur component in small amounts is used. According to this embodiment, therefore, the content of sulfur in the fuel is estimated, and the condition for executing the contamination-recovery operation is expanded when the fuel containing sulfur component in large amounts is used, in order to prevent a decrease in the absorbing capacity of the NOx occluding and reducing catalyst irrespective of the properties of the fuel.

Next, described below is a method of estimating the amount of SOx held by the NOx occluding and reducing catalyst 7 according to this embodiment. In this embodiment, the holding amount of SOx is estimated without using the SOx counter of the above-mentioned embodiment. When the holding amount of SOx is estimated by using the SOx counter as described above, the amount of SOx generated by the engine per a unit time which is used for the calculation by the SOx counter is that of when a standard fuel is used. When the sulfur content of the fuel deviates from that of the standard fuel, therefore, a difference often develops between the amount of SOx really held by the NOx occluding and reducing catalyst and the value of the SOx counter. According to this embodiment, therefore, the amount of SOx held by the NOx occluding and reducing catalyst 7 is calculated from a change in the output of the air-fuel ratio sensor 31 during the operation (regenerating operation) for releasing and reducing NOx from the NOx occluding and reducing catalyst 7.

During the regenerating operation of the NOx occluding and reducing catalyst, the exhaust gas having a rich air-fuel ratio flows into the NOx occluding and reducing catalyst. During the regenerating operation, however, NOx absorbed by the NOx occluding and reducing catalyst 7 are released therefrom and react with HC and CO in the exhaust gas. Therefore, if NOx are released from the NOx occluding and reducing catalyst during the regenerating operation, the exhaust gas at the outlet of the NOx occluding and reducing catalyst becomes the stoichiometric air-fuel ratio. When the NOx is no longer released from the NOx occluding and reducing catalyst, the exhaust gas at the outlet of the NOx occluding and reducing catalyst becomes a rich air-fuel ratio like the air-fuel ratio at the inlet thereof. Therefore, the time in which the air-fuel ratio at the outlet port of the catalyst is maintained at the stoichiometric air-fuel ratio (stoichiometric air-fuel ratio-holding time) is lengthened with an increase in the amount of NOx absorbed by the NOx occluding and reducing catalyst. In this embodiment, the operation for regenerating the NOx occluding and reducing catalyst is executed every time when the value of the NOx counter reaches a predetermined value. If other conditions remain the same, therefore, the stoichiometric air-fuel ratio-holding time will become constant during the regenerating operation. When SOx are absorbed by the NOx occluding and reducing catalyst, however, a maximum NOx-absorbing capacity of the NOx occluding and reducing catalyst decreases. As the amount of SOx held by the NOx occluding and reducing catalyst increases, therefore, the capacity for absorbing NOx of the NOx occluding and reducing catalyst decreases, and the stoichiometric air-fuel ratio-holding time is shortened correspondingly during the regenerating operation. That is, the stoichiometric air-fuel ratio-holding time during the regenerating operation can be used as a parameter to represent the amount of SOx held by the NOx occluding and reducing catalyst.

In this embodiment, therefore, the time ST is measured in which the output of the air-fuel ratio sensor 31 disposed in the discharge passage at the outlet of the NOx occluding and reducing catalyst 7 is maintained at a value corresponding to the stoichiometric air-fuel ratio, it is so judged that the amount of SOx held by the NOx occluding and reducing catalyst 7 has exceeded a permissible value (i.e., SOx contamination has occurred) when the time ST becomes shorter than a predetermined value $ST_0$, and the contamination-recovery operation is executed for the NOx occluding and reducing catalyst 7.

Upon executing the contamination-recovery operation, furthermore, the amount of SOx held by the NOx occluding and reducing catalyst 7 decreases and the stoichiometric air-fuel ratio-holding time ST increases. As the engine continues to operate, however, the amount of SOx held by the NOx occluding and reducing catalyst increases again depending upon the amount of SOx generated by the engine, and the stoichiometric air-fuel ratio holding time ST becomes shorter than $ST_0$ again after some period of time passes. That is, an interval RTI from the execution of the contamination-recovery operation in the previous time until when the contaminants build up again, varies in inverse proportion to the amount of SOx generated by the engine. On the other hand, the amount of SOx generated by the engine during the period RTI varies in proportion to the sum of sulfur components in the fuel fed to the engine. Therefore, the product of the total amount FJ of the fuel fed to the engine during he period RTI (integrated value of the amount of fuel injection during the period RTI) and the sulfur concentration SW of the fuel, varies in proportion to (1/RTI). In other words, FJ×SW=K×(1/RTI)(where K is a proportional constant) holds. Therefore, the sulfur concentration SW in the fuel is expressed by SW=K/(FJ×RTI), and varies in inverse proportion to FJ×RTI. When a value RTJ is defined as RTJ=1/(FJ×RTI), therefore, the value RTJ varies in proportion to the sulfur concentration in the fuel.

According to this embodiment, the period RTI from when the contamination-recovery operation is last executed to when the contaminant is detected again and the integrated value FJ of the amount of fuel injection during the period RTI is measured, and a value RTJ (=1/(FJ×RTI) calculated by using the above values is used as a parameter to represent the sulfur concentration in the fuel.

Figure 13:
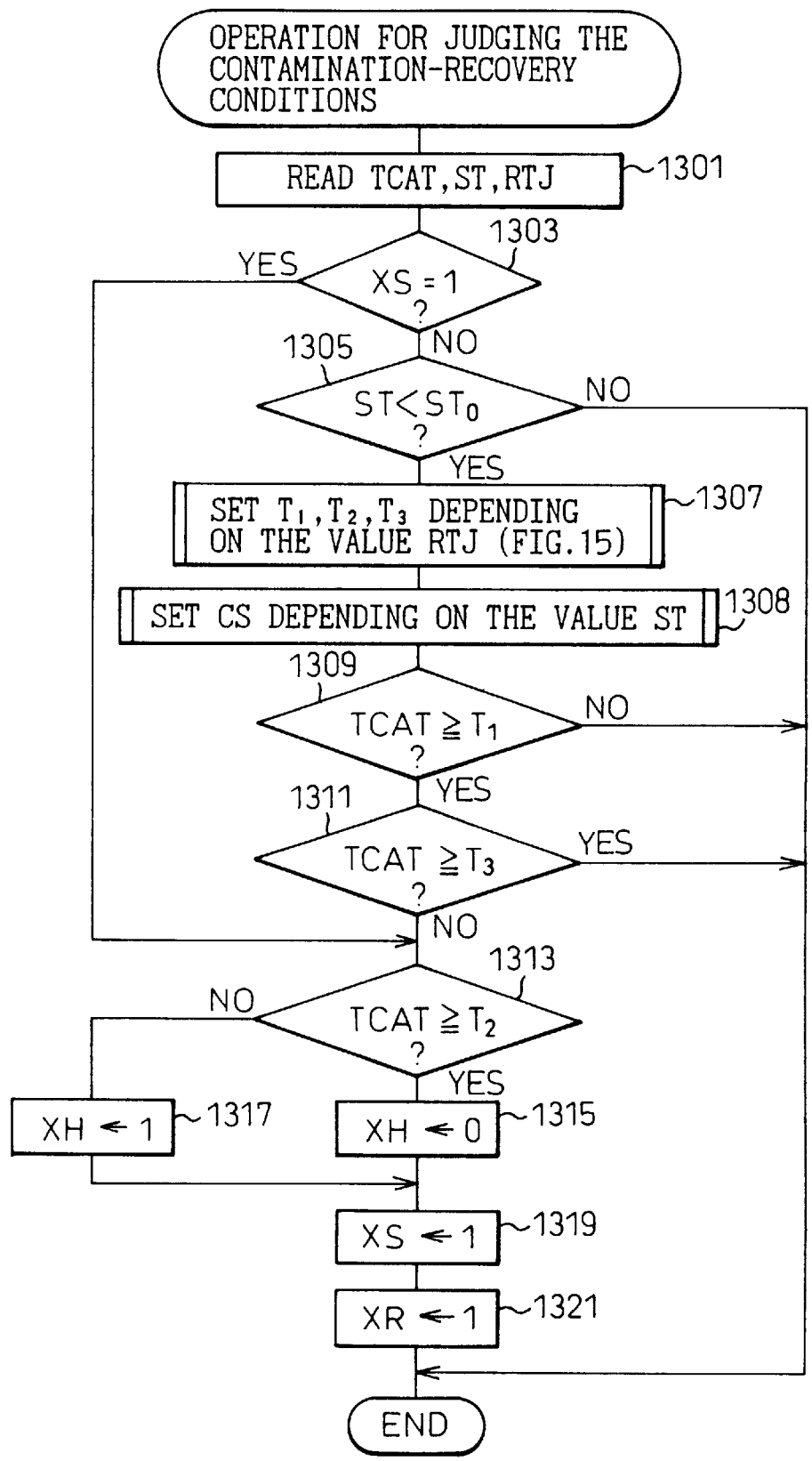
FIG. 13 is a flowchart explaining the operation for judging the contamination-recovery conditions for the NOx occluding and reducing catalyst according to an embodiment different from those of FIGS. 2, 6 and 12.
Figure 14:
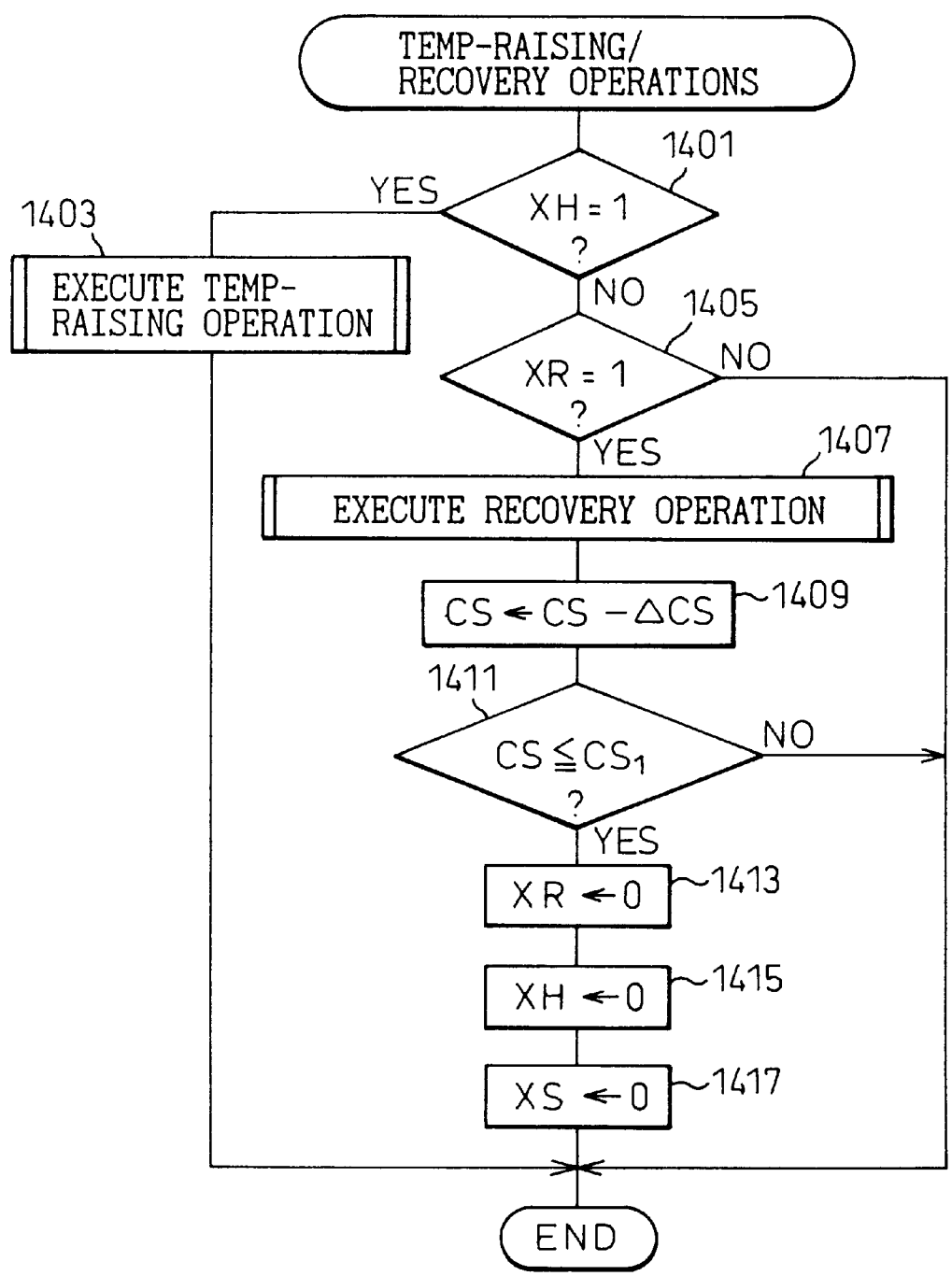
FIG. 14 is a flowchart explaining the temperature-raising and recovery operations according to the embodiment of FIG. 13.

Next, described below with reference to FIGS. 13 and 14 are the operation for judging the contamination-recovery conditions and the temperature-raising/recovery operations for the catalyst according to the embodiment. FIGS. 13 and 14 illustrate a case where the conditions for executing the contamination-recovery operation is set depending upon the catalyst temperature as in the embodiment of FIGS. 2 to 5.

The operations of FIGS. 13 and 14 are conducted as routines executed by the ECU 30 at predetermined intervals.

When the operation starts in FIG. 13, a catalyst temperature TCAT, an exhaust gas stoichiometric air-fuel ratio-holding time ST at the outlet port of the catalyst during the regenerating operation of the NOx occluding and reducing catalyst, and a parameter RTJ representing the sulfur concentration of the fuel, are read at a step 1301. Here, the catalyst temperature TCAT may be directly detected by the catalyst temperature sensor as in the embodiment of FIGS. 2 to 6, or calculated by a routine (not shown) separately executed by the ECU 30 as a calculated value based on the exhaust gas temperature and the exhaust gas flow rate. In this embodiment, furthermore, the ECU 30 measures the time in which the stoichiometric air-fuel ratio is maintained at a moment when the output of the air-fuel ratio sensor 31 at the outlet port of the catalyst changes in a manner of "lean→stoichiometric air-fuel ratio→rich" for every regenerating operation for the NOx occluding and reducing catalyst, and stores it as ST. By separately executing a routine (not shown), furthermore, the ECU 30 calculates the period RTI from when the SOx contamination-recovery operation was executed in the previous time until when the stoichiometric air-fuel ratio-holding time ST next decreases down to a predetermined value $ST_0$, and an integrated value FJ of the amount of fuel injection during the period RTI, in order to calculate a value RTJ (1/(FJ×RTI)).

At a step 1303, a value of the contamination-recovery operation execution flag XS is judged as at the step 203 in FIG. 2 and, if XS=1, the operation ends. When XS≈1, the routine proceeds to a step 1305.

At a step 1305, it is judged whether the stoichiometric air-fuel ratio-holding time ST during the regenerating operation of the previous time read at the step 1301 is shorter than $ST_0$ or not.

Figure 15:
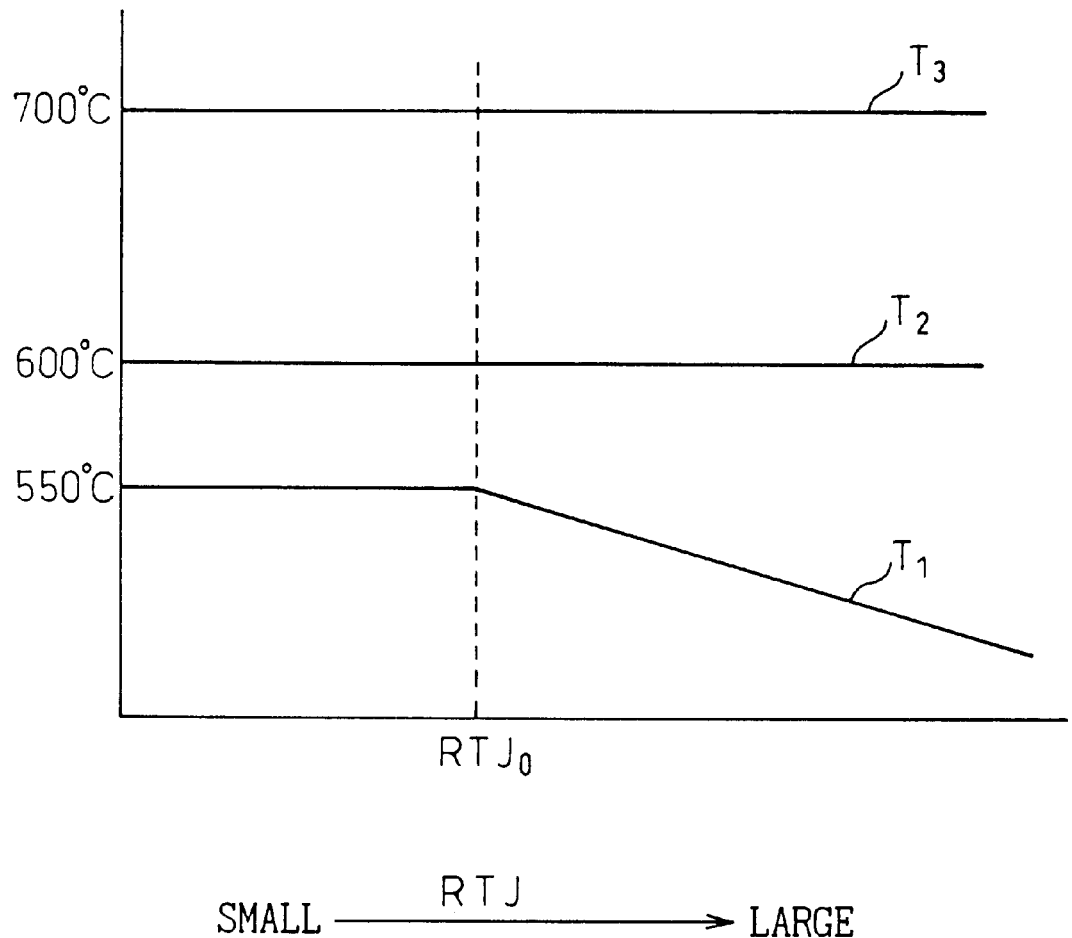
FIG. 15 is a diagram illustrating the catalyst temperatures for judgement of FIG. 4.

When $ST \geq ST_0$ at the step 1305, since the absorbing capacity of the NOx occluding and reducing catalyst does not decrease, the SOx contamination has not occurred. Therefore, the routine ends. When $ST<ST_0$, on the other hand, it is considered that the SOx contamination has occurred and the absorbing capacity of the NOx occluding and reducing catalyst has decreased. Therefore, the operations of a step 1307 and of subsequent steps are executed. That is, at the step 1307, the catalyst temperature-judging values $T_1$, $T_2$, $T_3$ are set depending upon the value of the sulfur concentration parameter RTJ. The temperature-judging values $T_1$ to $T_3$ have the same meanings as those of FIG. 4. FIG. 15 shows relationships between the temperature-judging values $T_1$, $T_2$, $T_3$ and RTJ according to this embodiment. In this embodiment, too, $T_2$ and $T_3$ are set to be constant ($T_2 \approx 600°$ C., $T_3 \approx 700°$ C.) irrespective of the sulfur concentration in the fuel. The temperature $T_1$ is set to be constant ($T_1=550°$ C.) over a range of $RTJ<RTJ_0$ but decreases with an increase in RTJ (with an increase in the sulfur concentration in the fuel) over a range of $RTJ \geq RTJ_0$. Here, $RTJ_0$ is a value when a standard fuel is used, and is found through experiment. As the sulfur concentration in the fuel increases, therefore, the contamination-recovery operation is executed even at low catalyst temperatures, making it possible to reliably prevent a decrease in the absorbing capacity of the NOx occluding and reducing catalyst irrespective of the properties of the fuel.

After the temperature-judging values $T_1$, $T_2$, $T_3$ are set as described above, an initial value of a counter CS is set depending upon the value ST at a step 1308. The counter CS is the same as the one that indicates the amount of SOx CSOX held by the NOx occluding and reducing catalyst. At the step 1308, the larger the amount of SOx held by the NOx occluding and reducing catalyst (the smaller the value ST), the larger the initial value of CS. The counter CS is used for judging the termination of the recovery operation of FIG. 14 (steps 1409, 1411).

The steps 1309 to 1319 of FIG. 13 are the same as the steps 209 to 219 of the flowchart of FIG. 2, and are not described here.

FIG. 14 is a flowchart the same as that of FIG. 3, and explains the temperature-raising operation and the recovery operation for the catalyst according to the embodiment. The operations of FIG. 14 are the same as the operations of FIG. 2 with the exception of using, at the steps 1409 and 1411, the counter CS set at the step 1308 instead of using the NOx counter CSOX of FIG. 2, for judging the termination of the recovery operation (steps 209, 211). Therefore, the operations of FIG. 14 are not described here in detail (in FIG. 14, values ΔCS and $CS_1$ correspond to ΔCSOX and $CSOX_1$ of FIG. 3).

Next, a further embodiment of the present invention will be described with reference to FIGS. 16 to 19.

In this embodiment, whether the contamination-recovery operation be executed or not is judged based on the engine load conditions (amount of fuel injection, engine rotational speed) as in the embodiment of FIGS. 6 to 9. In the embodiment of FIGS. 6 to 9, the engine load conditions for executing the contamination-recovery operation were set depending upon the amount of SOx held by the NOx occluding an reducing catalyst. In this embodiment, however, the engine load conditions for executing the contamination-recovery operation are set depending upon the cooling water temperature of the engine.

When the cooling water temperature is low at the start of the engine, the fuel vaporizes little; i.e., the fuel injected into the cylinder may adhere in a liquid form onto the piston and the like. Therefore, the mixture in the cylinder becomes lean compared to when the injected fuel is all vaporized. On the other hand, the liquid fuel adhered onto the piston vaporizes when the mixture in the cylinder burns and forms unburned hydrocarbons in the exhaust gas. Despite the fuel being injected in the same amount, therefore, the combustion air-fuel ratio in the cylinder becomes lean and hydrocarbons increase in the exhaust gas when the cooling water temperature is low compared with when the cooling water temperature is high. As the amount of unburned components increases in the exhaust gas as described above, the temperature of the NOx occluding and reducing catalyst rises due to the combustion of hydrocarbons on the NOx occluding and reducing catalyst. When the cooling water temperature of the engine is low, therefore, the catalyst is placed in a state in which it can be easily heated compared to when its temperature is high. If consideration is given to the case where the fuel is injected in an increased amount for heating the catalyst, furthermore, the combustion air-fuel ratio becomes lean when the cooling water temperature is low compared to when the cooling water temperature is high despite the fuel is injected in the same amount. Therefore, the combustion air-fuel ratio does not become very rich despite the fuel being injected in an amount that is increased to some extent, and most of the fuel injected in an increased amount is supplied as unburned hydrocarbons to the NOx occluding an reducing catalyst. In a state where the cooling water temperature is low, therefore, the temperature of the NOx occluding and reducing catalyst can be raised within a relatively short period of time without deteriorating the exhaust gas emission and the fuel efficiency.

In this embodiment, therefore, when the cooling water temperature is low, the engine load condition for executing the contamination-recovery operation is expanded, so that the contamination-recovery operation can be easily executed. In the operating condition where the cooling water temperature is low such as at the start of the engine, therefore, the chances for executing the SOx contamination-recovery operation increase, and the state where SOx are held in an increased amount by the NOx occluding an reducing catalyst is prevented from lasting long after the start of the engine.

Figure 18:
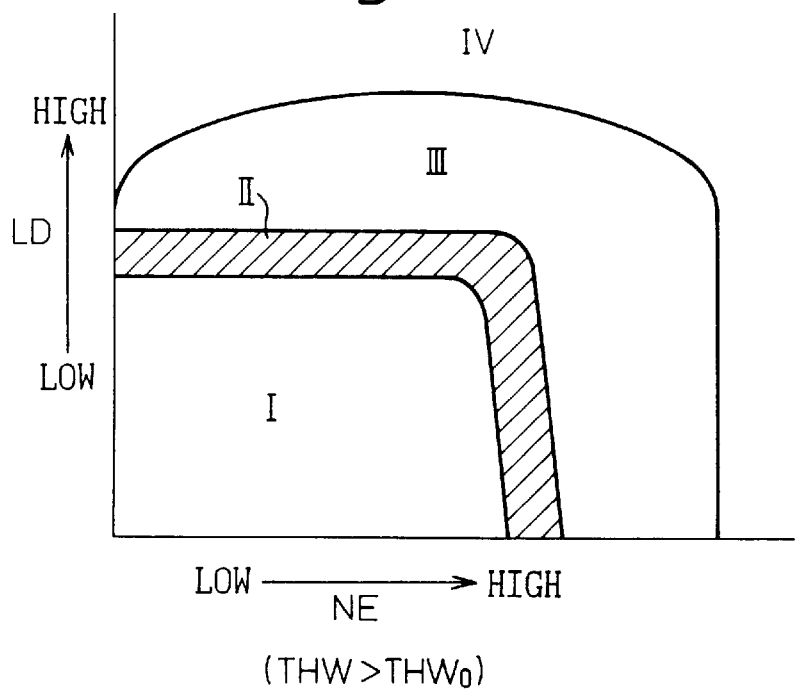
FIG. 18 is a diagram illustrating the engine operating conditions for executing the temperature-raising and recovery operations in the operation of FIG. 16.
Figure 19:
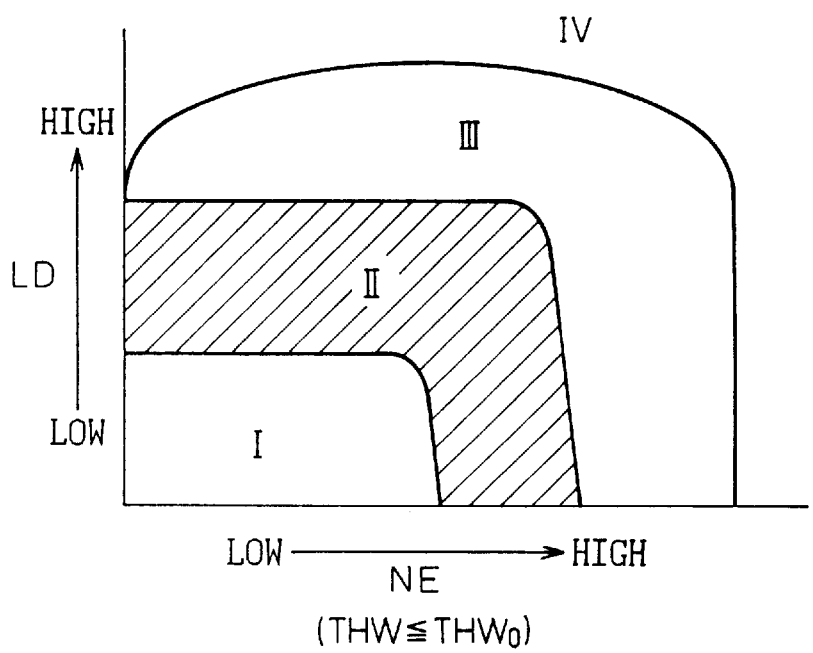
FIG. 19 is a diagram illustrating the engine operating conditions for executing the temperature-raising and recovery operations in the operation of FIG. 16.

FIGS. 18 and 19 illustrate the conditions for judging the execution of the contamination-recovery operation according to the embodiment. In FIGS. 18 and 19, the ordinate represents the engine load LD (amount of fuel injection) and the abscissa represents the engine rotational speed NE like in FIGS. 8 and 9. The regions I to IV correspond to the regions I to IV in FIG. 4.

FIG. 18 illustrates the execution judging conditions of when the cooling water temperature THW of the engine is higher than a predetermined value $THW_0$, and FIG. 19 illustrates the execution judging conditions of when THW is not higher than $THW_0$. Here, $THW_0$ is set to a cooling water temperature at which it can be judged that the engine has been warmed up. As will be understood from FIGS. 18 and 19, when the cooling water temperature THW is not higher than $THW_0$ (FIG. 19), the region II (where the temperature-raising operation is executed) is expanded toward the low-load side compared with when the cooling water temperature THW is higher than $THW_0$ (FIG. 18), and the contamination-recovery operation is executed at an increased frequency.

Figure 16:
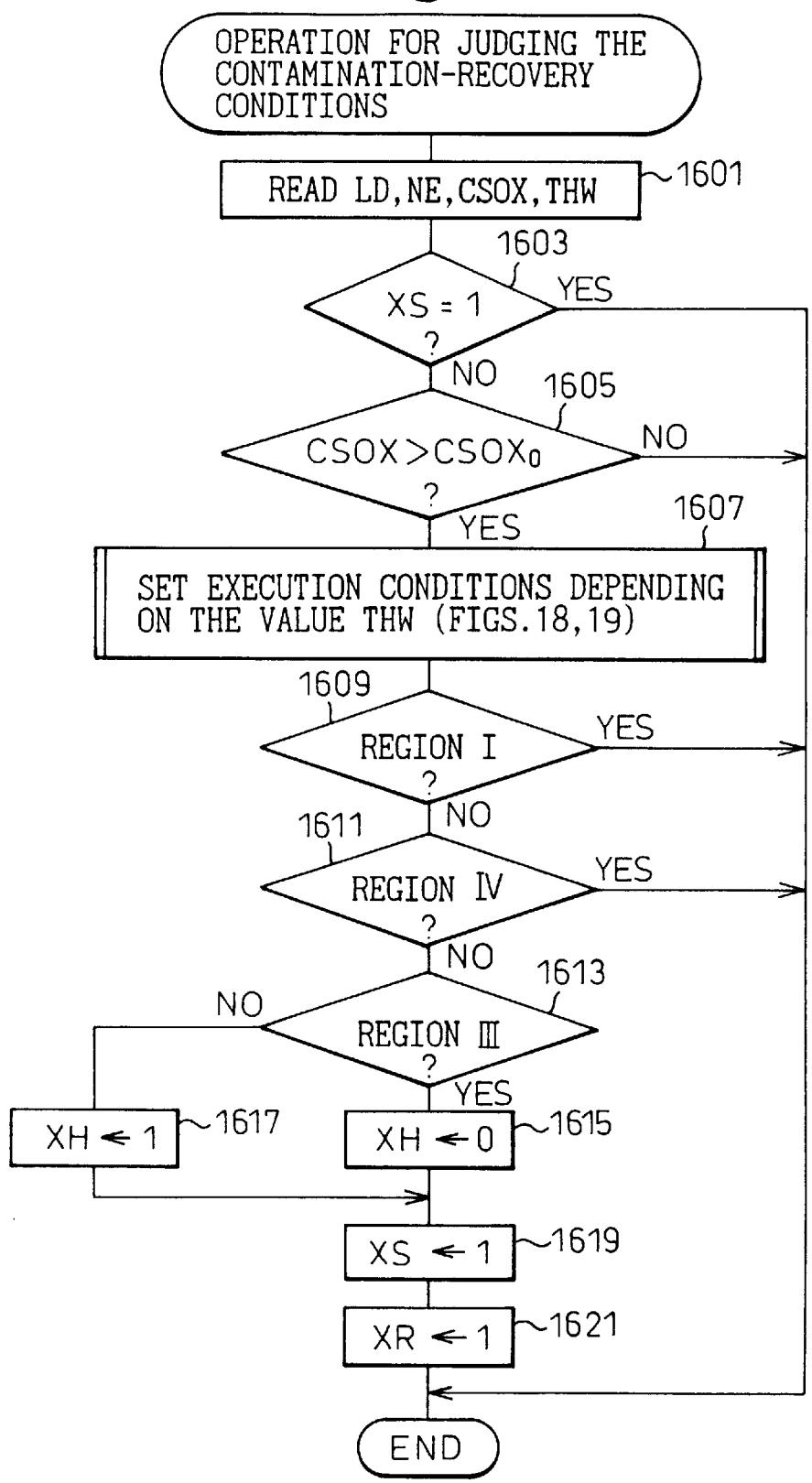
FIG. 16 is a flowchart explaining the operation for judging the contamination-recovery conditions for the NOx occluding and reducing catalyst according to an embodiment different from those of FIGS. 2, 6, 12 and 13.
Figure 17:
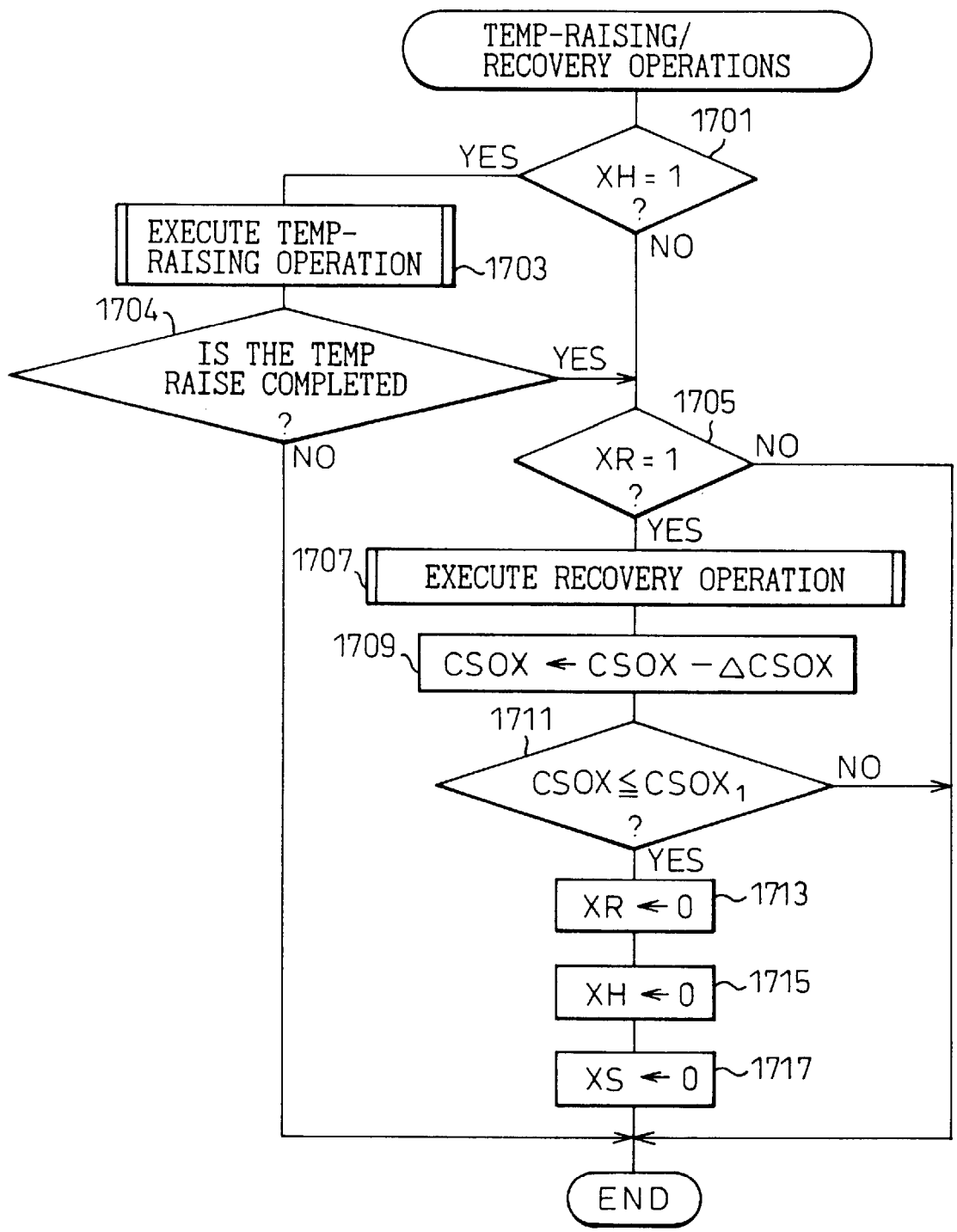
FIG. 17 is a flowchart explaining the temperature raising and recovery operations according to the embodiment of FIG. 16.

FIGS. 16 and 17 are flowcharts explaining the operation for judging the contamination-recovery conditions for the NOx occluding and reducing catalyst 7 and the temperature-raising/recovery operations according to the embodiment. The operation is conducted as a routine executed by the ECU 30 at predetermined intervals.

The operation of FIG. 16 is the same as that of the flowchart of FIG. 6 except that the engine load LD (amount of fuel injection), rotational speed, holding amount of SOx CSOX as well as the engine cooling water temperature THW from the cooling water temperature sensor 39, are read at a step 1601, and the contamination-recovery operation execution condition of either FIG. 18 or 19 is set at a step 1607 depending upon the cooling water temperature THW (whether THW is higher than the predetermined temperature $THW_0$ or not). The steps of FIG. 17 are the same as the steps of the flowchart of FIG. 7, and are not described here in detail.

Next, described below is a further embodiment according to the present invention. In this embodiment, too, the structure of the device is the same as the one described with reference to FIG. 1.

Figure 20:
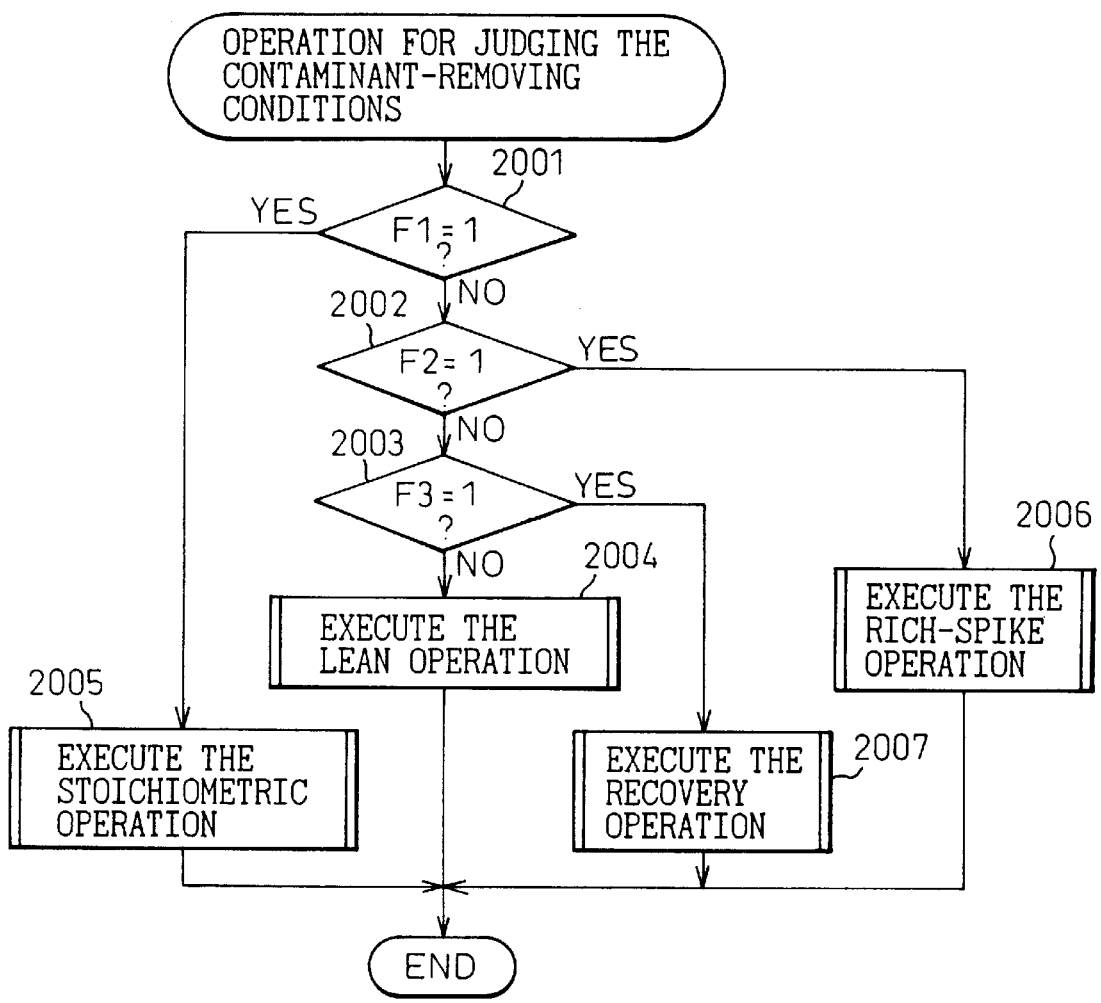
FIG. 20 is a flowchart explaining the operation for judging the contamination-recovery conditions for the NOx occluding and reducing catalyst according to an embodiment different from those of FIGS. 2, 6, 12, 13 and 16.

FIG. 20 is a flowchart explaining the operation for judging the SOx contamination-recovery conditions according to this embodiment. The operation is conducted as a routine executed by the ECU 30 at predetermined intervals. In FIG. 20, it is judged at a step 2001 whether a flag F1 that will be described later in detail is 1 or not. Under normal condition, this judgement is negative and the routine proceeds to a step 2002 where it is judged whether a flag F2 that will be described later in detail is 1 or not. Under normal condition, this judgement is negative and the routine proceeds to a step 2003 where it is judged whether a flag F3 that will be described later in detail is 1 or not. Under normal condition, this judgement is negative and the routine proceeds to a step 2004 to execute the lean operation.

Thus, the lean operation is executed under the normal condition, and NOx are contained in relatively large amounts in the exhaust gas. However, the exhaust gas are acquiring a lean state and have a large oxygen concentration. As described above, therefore, the NOx occluding and reducing catalyst 7 absorbs NOx in the exhaust gas.

The flag F1 is set when the engine in the present operating condition must produce a large output to cope with acceleration or a large load exerted on the engine. When the judgement at the step 2001 is affirmative, therefore, the routine proceeds to a step 2005 to execute a stoichiometric air-fuel ratio operation.

Due to the lean air-fuel ratio operation, the amount of NOx absorbed by the NOx occluding and reducing catalyst 7 gradually increases. As described above, since the amount of NOx that can be held by the NOx occluding and reducing catalyst 7 is finite, NOx must be released from the NOx occluding and reducing catalyst 7 and must be purified by reduction before the amount of NOx occluded exceeds the maximum NOx holding capacity. In this case, the flag F2 is set and the routine proceeds to a step 2006 where a rich-spike operation is executed.

Figure 21:
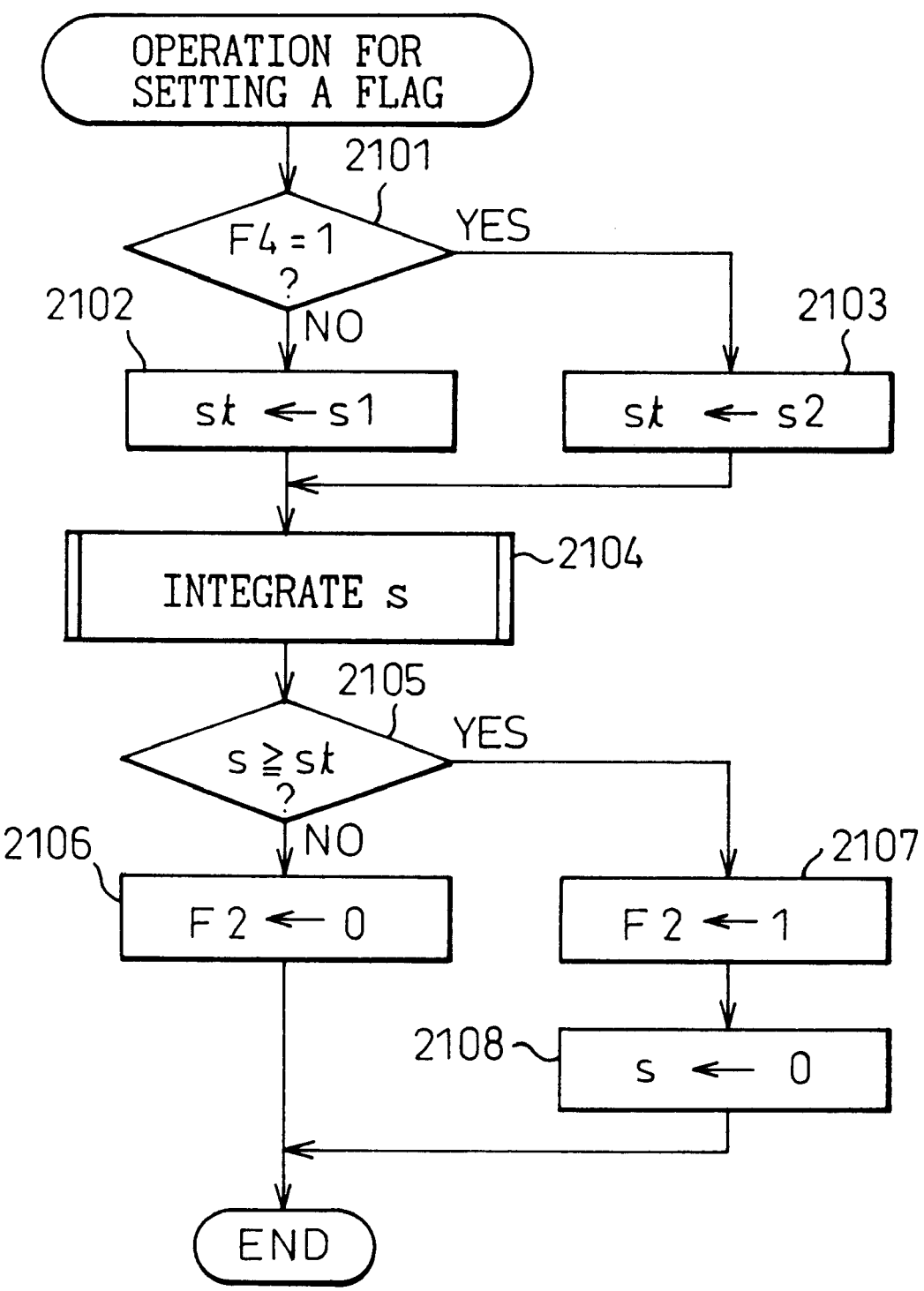
FIG. 21 is a flowchart explaining the operation for setting a flag in the flowchart of FIG. 20.

FIG. 21 is a flowchart explaining the operation for setting the flag F2. This operation is conducted as a routine executed by the ECU 30 after every predetermined period of time. At a step 2101, first, it is judged whether a flag F4 which will be described later in detail is 1 or not. At first, this judgement is negative, and the routine proceeds to a step 2102 where a target NOx occluding amount st is set to s1. This amount may be, for example, 70% of the NOx occluding capacity of the NOx occluding and reducing catalyst 7. Then, the amount of NOx absorbed by the NOx occluding and reducing catalyst 7 per a unit time is integrated during the lean air-fuel ratio operation, and the amount of NOx s held by the catalyst is calculated. The NOx holding amount is integrated relying on the amount of NOx generated by the internal combustion engine per a unit time based on the engine operating conditions as described above.

Then, at a step 2105, it is judged whether the NOx holding amount s has reached the target value st or not. When this judgement is negative, the routine proceeds to a step 2106 where the flag F2 ends remaining at 0. When the judgement at the step 2105 is affirmative, the routine proceeds to a step 2107 where the flag F2 is set to 1. At a step 2108, the NOx occluding amount s is set to 0, and the routine ends.

Figure 22:
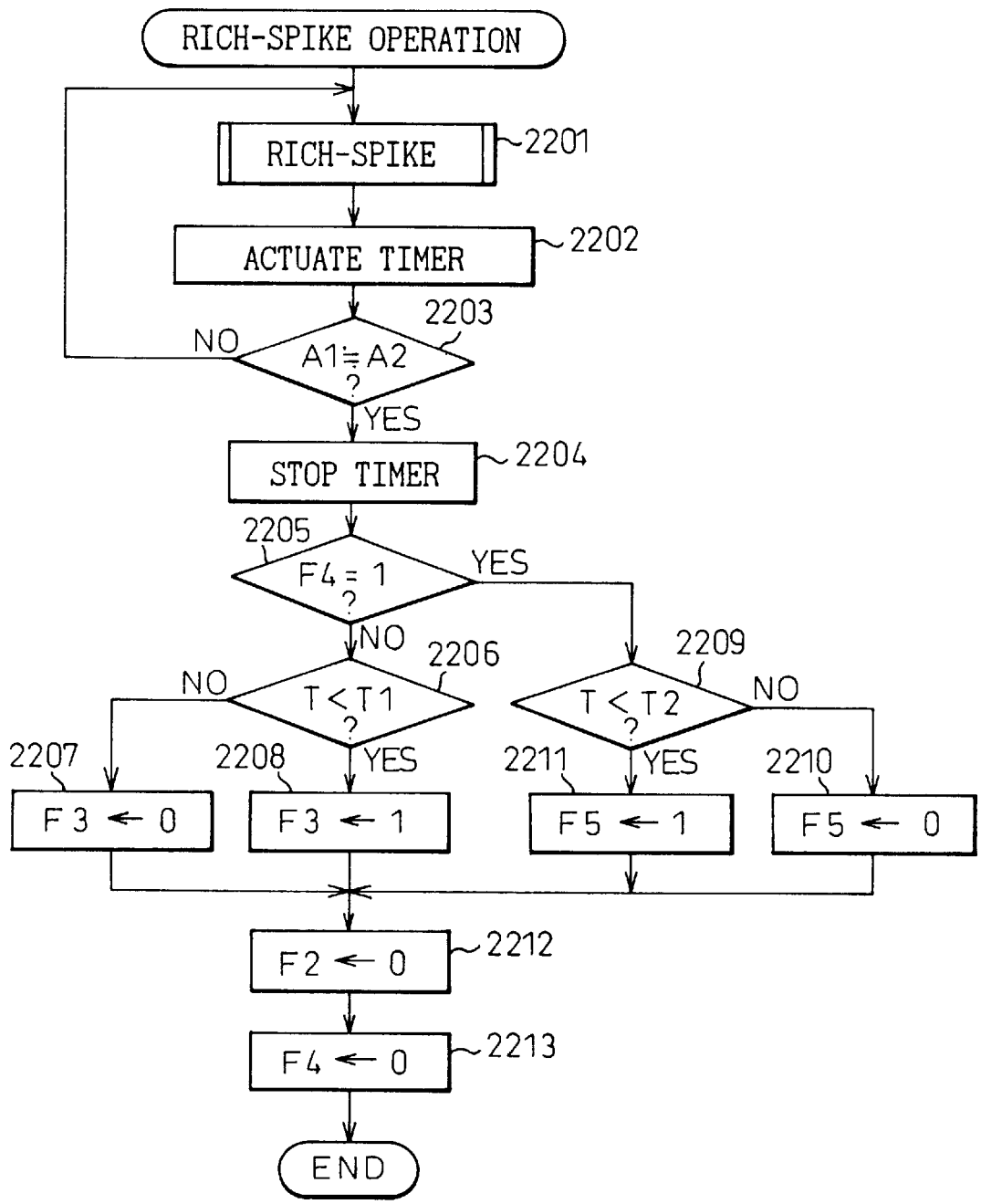
FIG. 22 is a flowchart explaining a rich-spike operation of FIG. 20.

FIG. 22 is a flowchart illustrating the rich-spike operation of the step 2006 of FIG. 20. In FIG. 22, first, the rich-spike is executed at a step 2201. The rich-spike operation is executed by the same method as the one described above, and is not described here in detail. Upon executing the rich-spike operation, NOx is released from the NOx occluding and reducing catalyst 7, and is purified by reduction with HC and CO contained in the exhaust gas.

Next, a timer is actuated at a step 2202, and it is judged at a step 2203 whether an average output value A1 of the air-fuel ratio sensors 29a and 29b on the upstream side is nearly in agreement with the output A2 of the air-fuel ratio sensor 31 on the downstream side or not. When this judgement is negative, the rich-spike operation is continued at the step 2201. As described above, when the NOx are being reduced by the rich-spike, the exhaust gas flowing out of the NOx occluding and reducing catalyst assume a stoichiometric air-fuel ratio which is different from the rich air-fuel ratio of the exhaust gas flowing into the NOx occluding and reducing catalyst 7. Therefore, the average output A1 of the air-fuel sensors 29a and 29b on the upstream side is different from the output A2 of the air-fuel ratio sensor 31 on the downstream side.

On the other hand, when NOx is all released from the NOx occluding and reducing catalyst 7 and is all reduced, the air-fuel ratio of the exhaust gas flowing out of the NOx occluding and reducing catalyst 7 becomes nearly equal to the air-fuel ratio of the exhaust gas flowing into the NOx occluding and reducing catalyst 7, whereby the average output A1 of the air-fuel ratio sensors 29a and 29b on the upstream side becomes nearly in agreement with the output A2 of the air-fuel sensor 31 on the downstream side, and the routine proceeds to a step 2204 where the rich-spike is interrupted and the timer stops. In this embodiment, the air-fuel ratio sensors are provided on both the upstream side and the downstream side of the NOx occluding and reducing catalyst 7 as shown in FIG. 1. It is, however, also allowable to provide the air-fuel ratio sensor on the downstream side of only the NOx occluding and reducing catalyst and to so judge that NOx is all released from the NOx occluding and reducing catalyst and is all reduced at a moment when the output of the air-fuel ratio sensor has changed from the stoichiometric air-fuel ratio to a rich air-fuel ratio.

Next, at the step 2205, it is judged whether the flag F4 that will be described later in detail is 1 or not. At first, this judgement is negative and the routine proceeds to a step 2206 where it is judged whether the time T counted by the timer is shorter than a first predetermined period of time T1 or not. The first predetermined period of time T1 is for releasing and reducing NOx in an amount of 70% of the NOx occluding capacity of the NOx occluding and reducing catalyst 7 at an air-fuel ratio of the exhaust gas during rich-spike operation. At present, where the target NOx occluding amount is 70% of the NOx occluding capacity, therefore, if the NOx occluding and reducing catalyst 7 is occluding NOx in the target amount, the judgement at the step 2206 is negative, an the routine proceeds to a step 2207 where the flag F3 is set to 0.

When the judgement is affirmative at the step 2206, on the other hand, it means that the NOx occluding and reducing catalyst 7 is occluding NOx only in an amount that is smaller than 70% of the NOx occluding capacity. This means that the SOx contamination has exceeded 30% of the NOx occluding capacity, since the above-mentioned integration operation is to relatively correctly calculate the amount of NOx that will be occluded by the NOx occluding and reducing catalyst 7. The SOx contamination mildly builds up compared with the frequency for executing the rich-spike. When the judgement at the step 2206 is affirmative, therefore, the SOx contamination is nearly 30% of the NOx occluding capacity. At this moment, the routine proceeds to a step 2208 where the flag F3 is set to 1. When the flag F3 is set, the judgement at the step 2003 becomes affirmative in the above-mentioned operation of FIG. 20, and the routine proceeds to a step 2007 to execute the SOx contamination-recovery operation.

After having passed the step 2207 or 2208 in the operation of FIG. 22, the flag F2 is set to 0 at a step 2212, and the flag F4 is set to 0 at a step 2213 to end the routine. Prior to describing the steps 2209 and 2210 of FIG. 22, described below is the operation for removing the SOx contamination with reference to FIG. 23.

At a step 2301, first, it is judged whether the processing can be executed or not. To remove the contamination due to SOx as described above, the NOx occluding and reducing catalyst 7 must have been heated at a temperature not lower than, for example, 600° C. Based on the present operating conditions of the engine, therefore, the judgement at step 2301 becomes affirmative when the temperature of the NOx occluding and reducing catalyst 7 lies within a predetermined temperature range which is not lower than 600° C., and the routine proceeds to a step 2302. The SOx contamination builds up relatively slowly. During this period, therefore, the amount of SOx occluded in the NOx occluding and reducing catalyst does not increase greatly.

When the temperature of the NOx occluding and reducing catalyst 7 is low as in the above-mentioned embodiment, the cylinders #1 and #4, for example, are operated at a rich air-fuel ratio and the cylinders #2 and #3 are operated at a lean air-fuel ratio; i.e., the exhaust gas of a rich state and the exhaust gas of a lean state are alternatingly emitted from the cylinders, and HC and CO are burned on the NOx occluding and reducing catalyst 7, so that the temperature of the NOx occluding and reducing catalyst 7 lies within a predetermined temperature range.

At a step 2302, it is judged whether a flag F5 that will be described later in detail is 1 or not. This judgement is, first, negated and the routine proceeds to a step 2304. At the step 2304, a target air-fuel ratio AFt of exhaust gas during the recovery operation is shifted toward the lean side by an amount dAF. The target air-fuel ratio AFt at first lies on the rich side beyond the stoichiometric air-fuel ratio by dAF. At a moment when the routine passes through the step 2304, first, the target air-fuel ratio AFt is the stoichiometric air-fuel ratio. Then, at a step 2305, the operation is so conducted that the exhaust gas acquires the target air-fuel ratio AFt.

Next, at a step 2306, it is judged whether a predetermined period of time has passed or not. When this judgement is negative, the processing of step 2305 is continued. That is, the operation in which the exhaust gas acquires the target air-fuel ratio AFt is continued for a predetermined period of time and at a step 2307, the flag F4 is set to 1 to end the routine. The operation in which the exhaust gas acquires the target air-fuel ratio AFt may be so conducted that the combustion air-fuel ratios in the cylinders acquire the target air-fuel ratio AFt, or may be so conducted that the combustion air-fuel ratios in the two cylinders of consecutive ignition timings as a whole assume the target air-fuel ratio AFt, or may be so conducted that the secondary fuel injection is effected, i.e., the fuel is directly fed into the engine exhaust system or the fuel is injected into the cylinders in the exhaust stroke to increase the amount of unburned fuel in the exhaust gas, so that the exhaust gas acquires the target air-fuel ratio AFt.

Thus, the SOx contamination-recovery operation ends and at this moment only, the flag F4 is set. In the operation of FIG. 21 for setting the flag F2, therefore, the judgement at the step 2101 is affirmed, and the routine proceeds to the step 2103. At this moment only, the target NOx occluding amount st is set to s2. This amount s2 is equal to the NOx occluding capacity of the NOx occluding and reducing catalyst 7. At the step 2105, therefore, the flag F2 is not set until it is so calculated that NOx are occluded in an amount equal to 100% of the NOx occluding capacity only one time after the SOx contamination-recovery operation.

After the flag F2 is set, the above-mentioned operation of FIG. 22 is executed. This time, however, the flag F4 is 1, the judgement at the step 2205 is affirmative, and the routine proceeds to the step 2209. At the step 2209, it is judged whether the time T counted by the timer is shorter than a second predetermined period of time T2. The second predetermined period of time T2 is for releasing and reducing NOx in an amount equal to 100% of the NOx occluding capacity of the NOx occluding and reducing catalyst 7 at an air-fuel ratio of the exhaust gas during rich-spike operation. If NOx in an amount equal to 100% of the NOx occluding capacity has been occluded in the NOx occluding and reducing catalyst, i.e., if the contamination due to SOx has been completely removed by the recovery operation, the judgement at the step 2209 is negative, and the routine proceeds to a step 2210 where the flag F5 is set to 0.

When the judgement at the step 2209 is affirmative, on the other hand, it means that NOx has not been occluded by the NOx occluding and reducing catalyst 7 in an amount equal to 100% of the NOx occluding capacity, and the NOx occluding and reducing catalyst 7 has not completely recovered from the SOx contamination. In this case, the flag F5 is set to 1 at a step 2211. In this embodiment as described above, a general deterioration detection method is used for evaluating the degree of recovery after the recovery operation.

Figure 23:
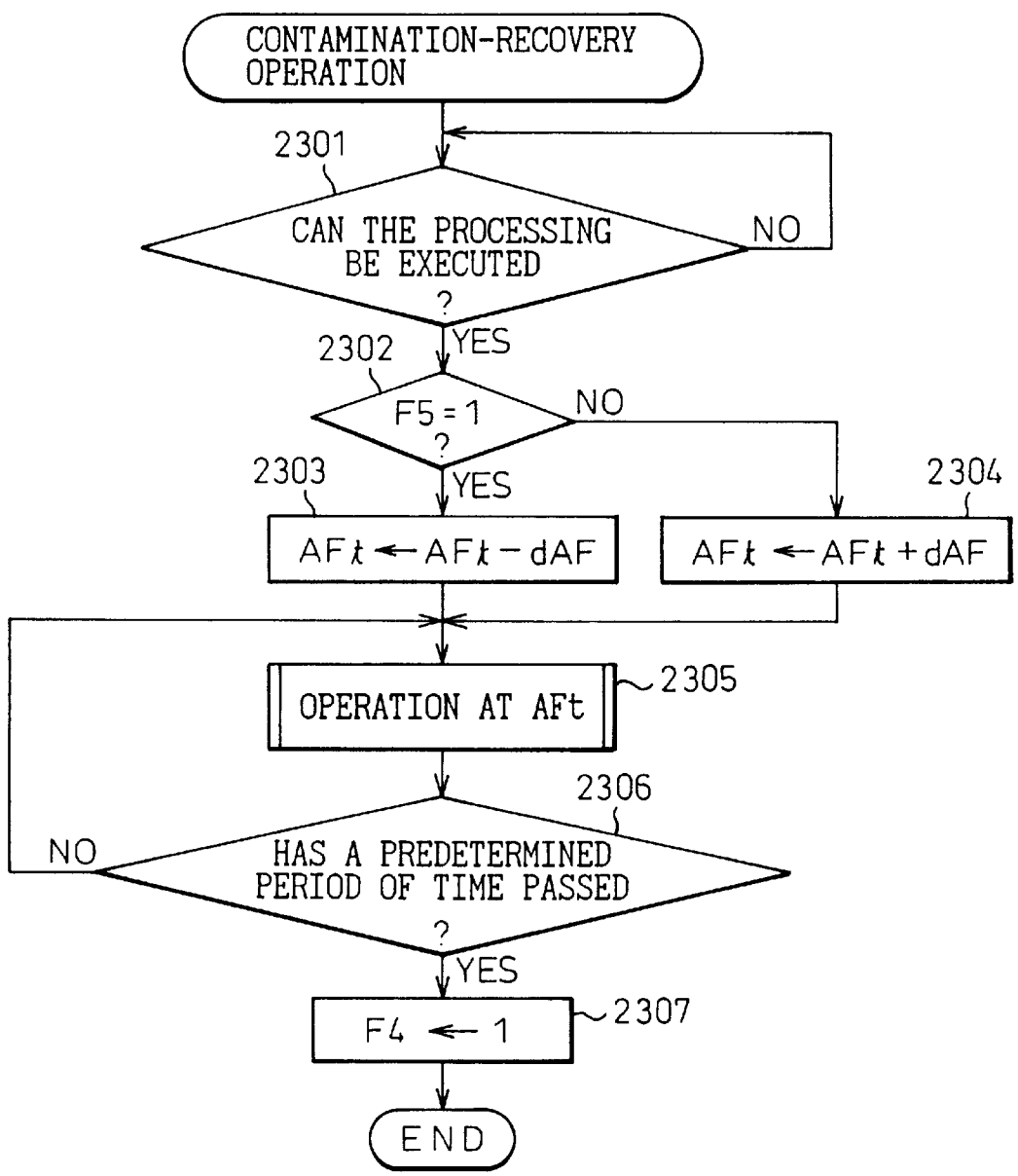
FIG. 23 is a flowchart explaining the contamination-recovery operation of FIG. 20.

When the flag F5 is set, the judgement at the step 2302 is affirmed in the operation of FIG. 23 after the SOx contamination-recovery operation of the next time, and the target air-fuel ratio AFt of exhaust gas is shifted, at step 2303, toward the rich side by dAF, and the recovery operation is conducted for a predetermined period of time.

At a moment when the SOx contamination of the NOx occluding and reducing catalyst 7 has reached 30% of the NOx occluding capacity, the recovery operation is conducted in which the exhaust gas acquires a stoichiometric air-fuel ratio or a rich air-fuel ratio for only a predetermined period of time as described above. When the NOx occluding and reducing catalyst is completely recovered, however, the air-fuel ratio of the exhaust gas during the recovery operation is gradually shifted toward the lean side. When the recovery is not sufficient, the air-fuel ratio of the exhaust gas is gradually shifted toward the rich side. The time T counted by the timer is inversely proportional to the non-recovering degree from the SOx contamination. The amount dAF for shifting the air-fuel ratio toward the rich side may be increased with a decrease in the counted time T.

To recover the NOx occluding and reducing catalyst from the SOx contamination, stable sulfates must be decomposed. For this purpose, the NOx occluding and reducing catalyst is heated to a temperature as high as 600° C. or more, and the oxygen concentration in the exhaust gas is decreased. In removing the SOx contamination, SOx is easily released when the temperature of the NOx occluding and reducing catalyst is high or when the oxygen concentration is low in the exhaust gas. Furthermore, the larger the amount of reducing substances in the exhaust gas, the larger the amount of oxygen consumed by the reducing substances on platinum Pt of the NOx occluding and reducing catalyst, and SOx is released more easily.

It is not allowed to elevate the temperature of the NOx occluding and reducing catalyst to an excess degree since the catalyst may be mechanically and functionally damaged. In this embodiment, the NOx occluding and reducing catalyst is heated to a predetermined temperature range (e.g., from 700° C. to 800° C.). When the air-fuel ratio of the exhaust gas is set to become excessively rich during the recovery operation, the oxygen concentration decreases since a large amount of reducing substances is included in the exhaust gas. Though this guarantees the recovery from the SOx contamination this causes a decrease in the fuel efficiency, and deterioration of the exhaust gas emission.

In order to completely recover the NOx occluding and reducing catalyst that is contaminated with SOx to a degree of 30% of the NOx occluding capacity by heating it within a predetermined temperature range for a predetermined period of time without deteriorating the exhaust gas emission as done in this embodiment, it can be contrived to set the air-fuel ratio of the exhaust gas to a predetermined air-fuel ratio.

However, easiness for releasing SOx from the NOx occluding and reducing catalyst 7 varies depending upon the SOx concentration in the exhaust gas during the recovery operation. That is, when the sulfur concentration in the fuel which is a precursor of SOx is high, the SOx concentration becomes high in the exhaust gas, and SOx are less released from the NOx occluding and reducing catalyst 7 correspondingly. To accomplish the complete recovery, therefore, the air-fuel ratio of the exhaust gas must be set to be more rich than the predetermined air-fuel ratio.

When the sulfur concentration in the fuel is low, on the other hand, the SOx concentration in the exhaust gas becomes low, and SOx is easily released from the NOx occluding and reducing catalyst 7, correspondingly. To improve the exhaust gas emission, therefore, the air-fuel ratio of the exhaust gas must be set to be more lean than the predetermined air-fuel ratio.

In this embodiment as described above, the degree of recovery from SOx contamination is evaluated based on the NOx occluding capacity after the recovery operation. When the catalyst has been completely recovered, the air-fuel ratio of the exhaust gas is shifted toward the lean side in the recovery operation of the next time. When the catalyst has not been completely recovered, the air-fuel ratio of the exhaust gas is shifted toward the rich side in the recovery operation of the next time. In the recovery operation, therefore, the air-fuel ratio of the exhaust gas is set to an optimum air-fuel ratio for guaranteeing a complete recovery depending upon the sulfur concentration in the fuel without deteriorating the exhaust gas emission.

The optimized air-fuel ratio of the exhaust gas is a value corresponding to the sulfur concentration in the fuel and the SOx concentration in the exhaust gas. Upon monitoring the air-fuel ratio, therefore, it is possible to estimate the amount of sulfates formed by SOx and to let the driver know also the degree of the possibility of corrosion in the engine exhaust system caused by sulfates.

Figure 24:
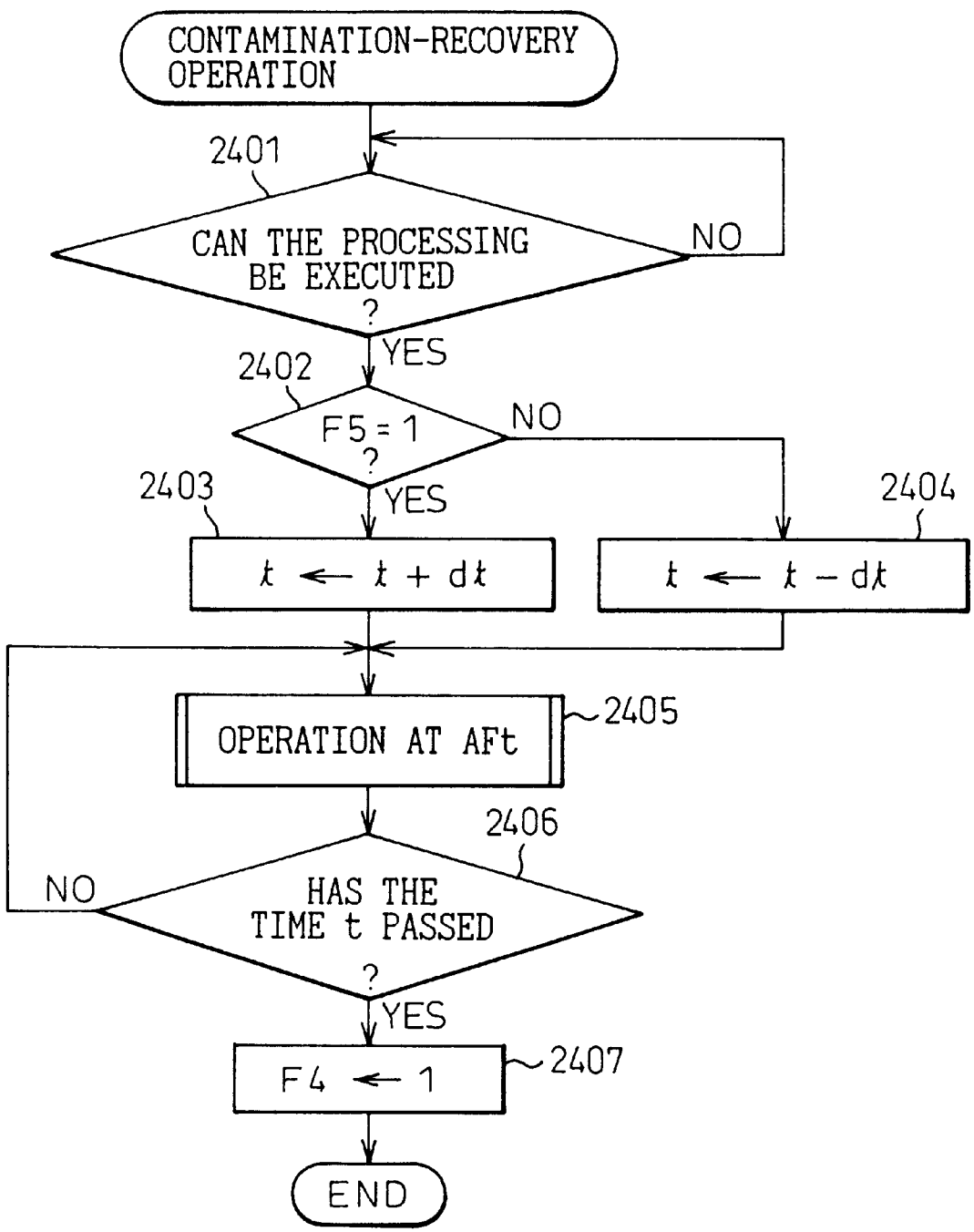
FIG. 24 is a flowchart explaining the contamination-recovery operation different from that of FIG. 23.

FIG. 24 is a flowchart explaining the SOx contamination-recovery operation different from that of FIG. 23. Described below is only a difference from the flowchart of FIG. 23. In this operation, when it is judged at a step 2402 that the flag F5 is 1, i.e., when the recovery from the SOx contamination is not sufficient, the target recovery operation time t is extended by dt. When the flag F5 is 0, i.e., when the SOx contamination is completely removed, the target recovery operation time t is shortened by dt.

Thereafter, at steps 2405 and 2406, the air-fuel ratio of the exhaust gas is set to be a stoichiometric air-fuel ratio or a predetermined rich air-fuel ratio and, at a step 2403 or 2404, the recovery operation is conducted for only a target recovery operation time t that is changed. During the recovery operation as described above, the air-fuel ratio of the exhaust gas is set to be a predetermined air-fuel ratio and the target recovery operation time is changed, in order to accomplish an optimum recovery operation time that guarantees a complete recovery depending upon the sulfur concentration in the fuel without deteriorating the exhaust gas emission.

In the above-mentioned operations of FIGS. 23 and 24, either the air-fuel ratio of the exhaust gas or the recovering time is fixed and the other one is optimized depending upon the sulfur concentration in the fuel during the recovery operation. This, in other words, is to optimize the total amount of reducing substances flowing into the NOx occluding and reducing catalyst and to optimize the total amount of oxygen in compliance therewith during the period of recovery operation. For this purpose, therefore, both the air-fuel ratio of the exhaust gas and the recovering time may be changed depending upon the sulfur concentration in the fuel.

In the operation of FIG. 23, furthermore, the target air-fuel ratio of the exhaust gas during the recovery operation is, first, set to be the stoichiometric air-fuel ratio as described earlier and is then gradually shifted toward the rich side to accomplish an optimum air-fuel ratio depending upon the sulfur concentration in the fuel. When the sulfur concentration of the fuel is very low, the target air-fuel ratio changes near the stoichiometric air-fuel ratio, and the target air-fuel ratio readily becomes an optimum air-fuel ratio. When the sulfur concentration in the fuel is relatively high and the optimum air-fuel ratio is rich to a high degree, the recovery from the SOx contamination is not sufficient in the recovery operation of before the target air-fuel ratio becomes the optimum air-fuel ratio and, hence, the recovery operation must be conducted relatively frequently. The recovery operation is not desirable since it deteriorates the fuel efficiency compared to that of during the normal lean operation.

Figure 25:
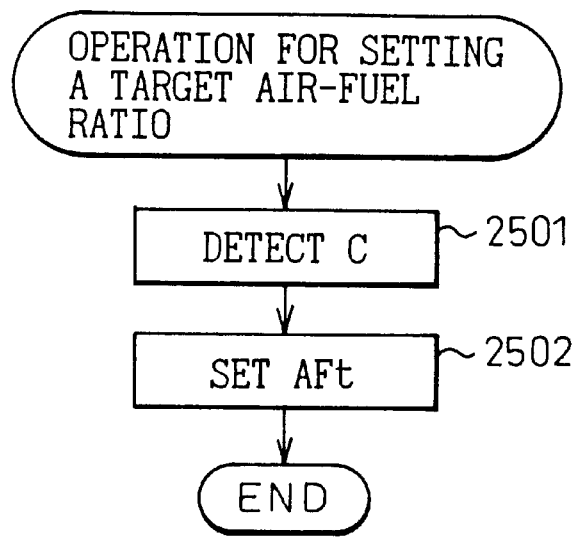
FIG. 25 is a flowchart explaining the operation for setting a target air-fuel ratio at the time of the recovery operation.

In order to solve this problem, the sulfur concentration in the fuel may be detected as shown in a flowchart of FIG. 25, and the target air-fuel ratio AFt may be set depending upon the sulfur concentration. That is, in the operation of FIG. 25, the sulfur concentration in the fuel is directly detected by the sulfur concentration sensor at a step 2501, and a first target air-fuel ratio AFt in the recovery operation is set at a step 2502 based on the sulfur concentration found from a map shown in FIG. 26. It is therefore allowed to readily set the target air-fuel ratio AFt to the optimum air-fuel ratio in the operation of FIG. 23, preventing the recovery operation from being frequently executed.

Figure 26:
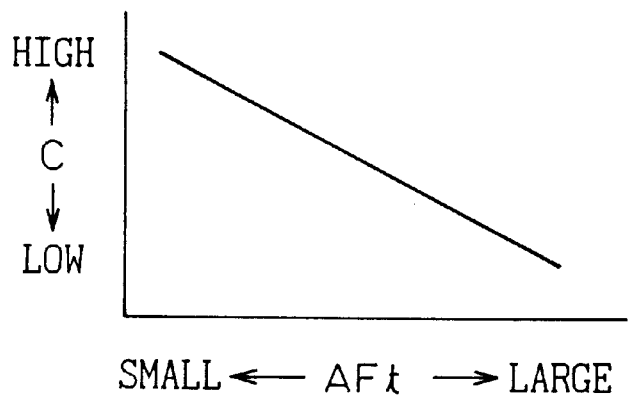
FIG. 26 is a map of target air-fuel ratios used for the operation of FIG. 25.

In the map shown in FIG. 26, the rich degree of the target air-fuel ratio AFt is set to increase with an increase in the sulfur concentration. If the map is correctly formed by experiment, the target air-fuel ratio AFt needs not be changed depending upon the degree of recovery from the SOx contamination in the operation of FIG. 23, and can be used as the air-fuel ratio of the exhaust gas during the recovery operation. It is, of course, possible to set a target recovery operation time from a map depending upon the sulfur concentration in the fuel relying on the same idea.

What is claimed is:

1. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants adsorbed or absorbed by said NOx occluding and reducing catalyst;

a heating means for releasing said contaminants from the NOx occluding and reducing catalyst by heating said NOx occluding and reducing catalyst when the amount of said contaminants increases to be in excess of a predetermined judging value and when the operating condition of the engine turns into a predetermined heating-conducting condition; and a heating-conducting condition-setting means for setting said heating-conducting condition depending upon the amount of said contaminants that are held in the NOx occluding and reducing catalyst.

2. An exhaust gas purification device for an internal combustion engine according to claim 1, wherein said heating-conducting condition is given as a temperature of said NOx occluding and reducing catalyst.

3. An exhaust gas purification device for an internal combustion engine according to claim 1, wherein said heating-conducting condition is given as a load condition of the engine.

4. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants adsorbed or absorbed by said NOx occluding and reducing catalyst;

a heating means for releasing said contaminants from the NOx occluding and reducing catalyst by heating said NOx occluding and reducing catalyst when the amount of said contaminants increases to be in excess of a predetermined judging value and when the operating condition of the engine turns into a predetermined heating-conducting condition; and a heating-conducting condition-setting means for setting said heating-conducting condition depending upon the history of the operating conditions of the engine.

5. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants from the exhaust gas;

a holding amount estimation means for estimating the amount of said contaminants adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the properties of the fuel of the engine.

6. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants adsorbed or absorbed by said NOx occluding and reducing catalyst;

a heating means for releasing said contaminants from the NOx occluding and reducing catalyst by heating said NOx occluding and reducing catalyst when the amount of said contaminants increases in excess of a predetermined judging value and when the operating condition of the engine turns into a predetermined heating-conducting condition; and a heating-conducting condition-setting means for setting said heating-conducting condition depending upon the temperature of the cooling water of the engine.

7. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants adsorbed or absorbed by said NOx occluding and reducing catalyst;

a recovering means which maintains said NOx occluding and reducing catalyst within a predetermined high-temperature range for a predetermined recovering period when the holding amount of said contaminants estimated by said holding amount estimation means has reached a predetermined value, and controls the air-fuel ratio of the exhaust gas flowing into said NOx occluding and reducing catalyst to assume a recovering air-fuel ratio at which said contaminants are released;

a recovering degree evaluation means for evaluating the degree of recovery of the capability of absorbing, releasing and reducing NOx by reduction of said NOx occluding and reducing catalyst accomplished by said recovering means; and a first changing means for changing the total amount of the reducing substances in the exhaust gas flowing into said NOx occluding and reducing catalyst during the recovering period of the next time depending upon the degree of recovery evaluated by said recovering degree evaluation means.

8. An exhaust gas purification device for an internal combustion engine according to claim 7, wherein said first changing means changes the total amount of said reducing substances flowing into said NOx occluding and reducing catalyst during the recovering period of the next time by changing said recovering air-fuel ratio.

9. An exhaust gas purification device for an internal combustion engine according to claim 7, wherein said first changing means changes the total amount of said reducing substances flowing into said NOx occluding and reducing catalyst during the recovering period of the next time by changing the length of said recovering period.

10. An exhaust gas purification device for an internal combustion engine according to claim 7, wherein said recovering degree evaluation means includes a means for detecting the NOx absorbing capacity of said NOx occluding and reducing catalyst, and evaluates said recovering degree based on the NOx absorbing capacity of said NOx occluding and reducing catalyst at the time when said recovering period has elapsed.

11. An exhaust gas purification device for an internal combustion engine comprising:

an NOx occluding and reducing catalyst disposed in an exhaust gas passage of the internal combustion engine to absorb NOx in the exhaust gas when the air-fuel ratio of the exhaust gas flowing in is larger than a stoichiometric air-fuel ratio and to release and reduce the absorbed NOx when the air-fuel ratio of the exhaust gas flowing in becomes smaller than the stoichiometric air-fuel ratio, said NOx occluding and reducing catalyst exhibiting a decrease in the capability of absorbing, releasing and reducing the NOx as it adsorbs or absorbs contaminants in the exhaust gas;

a holding amount estimation means for estimating the amount of said contaminants held by being adsorbed or absorbed by said NOx occluding and reducing catalyst;

a recovering means which maintains said NOx occluding and reducing catalyst within a predetermined high-temperature range for a predetermined recovering period when the holding amount of said contaminants estimated by said holding amount estimation means has reached a predetermined value, and controls the air-fuel ratio of the exhaust gas flowing into said NOx occluding and reducing catalyst to assume a recovering air-fuel ratio at which said contaminants are released;

an estimation means for estimating the concentration of precursors of said contaminants in the fuel; and a second changing means for changing the total amount of the reducing substances flowing into said NOx occluding and reducing catalyst during said recovering period depending upon the concentration of said precursors estimated by said estimation means.

12. An exhaust gas purification device for an internal combustion engine according to claim 11, wherein said second changing means changes the total amount of said reducing substances flowing into said NOx occluding and reducing catalyst during said recovering period by changing said recovering air-fuel ratio.

13. An exhaust gas purification device for an internal combustion engine according to claim 11, wherein said second changing means changes the total amount of said reducing substances flowing into said NOx occluding and reducing catalyst during said recovering period by changing the length of said recovering period.

* * * * *